(12) United States Patent
Goto et al.

(10) Patent No.: US 8,199,484 B2
(45) Date of Patent: Jun. 12, 2012

(54) ELECTRONIC DEVICE

(75) Inventors: Katsuichi Goto, Kawasaki (JP); Sonomasa Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 329 days.

(21) Appl. No.: 12/222,913

(22) Filed: Aug. 19, 2008

(65) Prior Publication Data

US 2009/0154084 A1  Jun. 18, 2009

(30) Foreign Application Priority Data

Dec. 17, 2007 (JP) .................................. 2007-324640

(51) Int. Cl. *G06F 1/16* (2006.01)
(52) U.S. Cl. ........... 361/679.46; 361/679.49; 361/679.5; 361/688; 361/679.27; 165/80.3
(58) Field of Classification Search ............... 361/679.49
See application file for complete search history.

(56) References Cited

U.S. PATENT DOCUMENTS

| | | | | |
|---|---|---|---|---|
| 4,739,316 A * | 4/1988 | Yamaguchi et al. | ............ | 345/87 |
| 5,243,549 A * | 9/1993 | Oshiba | ...................... | 361/679.09 |
| 5,313,362 A * | 5/1994 | Hatada et al. | ................... | 361/709 |
| 5,694,294 A * | 12/1997 | Ohashi et al. | ............. | 361/679.48 |
| 5,748,444 A * | 5/1998 | Honda et al. | .............. | 361/679.09 |
| 5,841,630 A * | 11/1998 | Seto et al. | ................. | 361/679.58 |
| 6,348,748 B1 * | 2/2002 | Yamamoto | .................... | 310/62 |
| 6,473,296 B2 * | 10/2002 | Amemiya et al. | ....... | 361/679.27 |
| 6,577,502 B1 * | 6/2003 | DiStefano et al. | ....... | 361/679.46 |
| 6,657,854 B2 * | 12/2003 | Horii et al. | ............... | 361/679.09 |
| 6,717,808 B2 * | 4/2004 | Ueda et al. | .................... | 361/695 |
| 6,744,631 B1 * | 6/2004 | Chuang et al. | ........... | 361/679.48 |
| 6,847,524 B2 * | 1/2005 | Tomioka et al. | ............. | 361/695 |
| 6,924,978 B2 * | 8/2005 | DiStefano | ...................... | 361/688 |
| 7,106,585 B2 * | 9/2006 | Lin | .......................... | 361/679.49 |
| 7,203,062 B2 * | 4/2007 | Tsuji | .............................. | 361/695 |
| 7,312,988 B2 * | 12/2007 | Maeda | ...................... | 361/679.48 |
| 7,457,113 B2 * | 11/2008 | Kumhyr et al. | ........... | 361/679.48 |
| 7,466,548 B2 * | 12/2008 | Ishikawa | ........................ | 361/698 |
| 7,660,118 B2 * | 2/2010 | Tatsukami et al. | ............. | 361/697 |
| 7,660,119 B2 * | 2/2010 | Iikubo | ............................ | 361/697 |
| 7,667,961 B2 * | 2/2010 | Fujiwara | .................. | 361/679.47 |
| 7,692,634 B2 * | 4/2010 | Kimura et al. | ................. | 345/168 |
| 7,764,493 B2 * | 7/2010 | Ali et al. | ................... | 361/679.51 |
| 2002/0114132 A1 * | 8/2002 | DiFonzo et al. | ................ | 361/687 |
| 2002/0186530 A1 * | 12/2002 | Nakajima et al. | ............. | 361/683 |
| 2003/0007322 A1 * | 1/2003 | Amemiya et al. | ............ | 361/683 |
| 2003/0142476 A1 * | 7/2003 | Tomioka et al. | ............. | 361/695 |
| 2005/0007739 A1 * | 1/2005 | Hata et al. | ..................... | 361/699 |
| 2006/0114653 A1 * | 6/2006 | Seto et al. | ..................... | 361/695 |
| 2007/0041157 A1 * | 2/2007 | Wang | ............................ | 361/687 |

FOREIGN PATENT DOCUMENTS

| | | |
|---|---|---|
| JP | 03-118622 | 5/1991 |
| JP | 04-284519 | 10/1992 |
| JP | 04-290107 | 10/1992 |
| JP | 08-263162 | 10/1996 |
| JP | 2000-105635 | 4/2000 |
| JP | 2000-223876 | 8/2000 |

* cited by examiner

*Primary Examiner* — Anthony Q Edwards
(74) *Attorney, Agent, or Firm* — Fujitsu Patent Center

(57) ABSTRACT

An electronic device includes: a first housing that includes an inlet and an outlet on one end; a second housing; and a linkage section that links the second housing to the first housing such that the second housing can be opened and closed. The device is configured such that the second housing divides at least a part of a space between the inlet and the outlet while the second housing is in the open position relative to the first housing. While the second housing is opened relative to the first housing, the second housing divides the space between the inlet and the outlet, thereby preventing the exhausted warm air from being drawn into the electronic device.

7 Claims, 24 Drawing Sheets

ELECTRONIC DEVICE

BACKGROUND OF THE INVENTION

1. Field of the Invention

The present invention relates to an electronic device provided with an inlet and an outlet.

2. Description of the Related Art

For an electronic device such as a personal computer, further speeding up of processing and diversification of mounted functions are demanded. To meet such demands, high performance and high density of electronic components built in the electronic device are promoted. As a result, higher heat is generated within the electronic device. There is a problem in that the performance of the electronic components degrades if heat is kept in the electronic device. Therefore, it is necessary to efficiently release the heat generated in the electronic device.

A heat release mechanism to release heat in the electronic device is widely used that includes: an inlet that draws air into a housing of the electronic device; an outlet from which heat in the housing is exhausted; a heat sink that absorbs the heat generated in the electronic components and conducts the heat to the outlet; and a cooling fan that causes air to absorb the heat in the heat sink and the outlet from which the air is exhausted. For example, Japanese Patent Application Publication No. 04-284519 discloses a technique to provide an inlet on the front side of a main housing and provide an outlet on the back side of the main housing on a portable electronic device in which a display housing is linked to the main housing such that the display housing can be opened/closed. Japanese Patent Application Publication No. 04-290107 discloses a technique to provide an outlet around a hinge section that links a main housing and a display housing. Japanese Patent Application Publication No. 03-118622 discloses a technique to provide an inlet on the top side of a display device and provide an outlet on the back side of the display device on a personal computer provided with a keyboard, the display device and a main device separately. Air taken in from the inlet reaches the outlet provided at a position apart from the inlet through an airway, and absorbs the heat conducted to the outlet by the heat sink. Further, a cooling fan for exhausting warmed air from the outlet, so that the heat in the electronic device can be emitted to the outside.

In recent years, an electronic device has been downsized. For this reason, a space is required to be reduced to house a heat sink and a cooling fan. In this regard, Japanese Patent Application Publication No. 08-263162 discloses a personal computer including an inlet provided on the back side of a main housing and an outlet provided on one lateral side of the main housing. The inlet and the outlet are provided nearby, so that a heat sink extending to link them can be compactly housed, allowing downsizing of the whole apparatus.

However, for the personal computer disclosed in Japanese Patent Application Publication No. 08-263162, the apparatus cannot be downsized sufficiently. Normally, an inlet and an outlet are ideally provided on the same surface of a housing. Meanwhile, there is a problem in that if an inlet and an outlet are provided nearby on the same surface, warm air exhausted from the outlet is drawn into the housing from the inlet, declining heat release efficiency.

SUMMARY OF THE INVENTION

The present invention has been made in view of the above circumstances and provides an electronic device that can provide both downsizing of the apparatus and improvement of heat release efficiency.

An electronic device according to the present invention includes:

a first housing that includes an inlet and an outlet on one end;

a second housing; and a linkage section that links the second housing to the first housing such that the second housing can be opened and closed, wherein the device is configured such that the second housing divides at least a part of a space between the inlet and the outlet while the second housing is opened relative to the first housing.

According to the electronic device of the present invention, the inlet and the outlet are provided on the one end of the first housing. However, when the second housing is in the open position relative to the first housing, the second housing divides the space between the inlet and the outlet. As such, even if air taken in from the inlet absorbs heat produced in the electronic device and is emitted from the outlet, it is possible to prevent the exhausted warm air from being drawn into the electronic device since the second housing divides the inlet and the outlet. Generally, the electronic device, in which the second housing is linked to the first housing such that the second housing can be opened and closed relative to the first housing, is often used with the second housing being opened. When the second housing is opened, a large quantity of heat is produced in the electronic device. According to the electronic device of the present invention, particularly the heat generated during the use of the electronic device can be surely released.

In the electronic device according to the present invention, preferably, the inlet is positioned above the outlet on the one end.

The inlet is often provided at a position near the bottom of the electronic device. However, there is a problem in that if the electronic device is continuously used, the whole electronic device gets warmed because of a large amount of heat generated by components such as a CPU, and the inlet takes in heat remaining around the bottom of the electronic device, declining the heat release efficiency.

According to the above-described additional feature, the inlet is provided above the outlet, so that the inlet hardly takes in the heat remaining around the bottom of the electronic device. Accordingly, the heat release efficiency can be maintained even if the electronic device is continuously used.

In the electronic device according to the present invention, preferably, the first housing is a main section of the electronic device containing a main processing circuit; and the inlet is positioned in the first housing such that the inlet is above the main processing circuit and exposed while the second housing is closed.

For a laptop personal computer, generally, the personal computer is used while the second housing is in the open position relative to the first housing. However, the computer can run while the second housing is in the closed position relative to the first housing, and the main processing circuit operates and generates heat in a manner similar to the state of the second housing being opened.

According to the above-described additional feature, the inlet is exposed even if the second housing is closed, so that the generated heat can be surely released.

In the electronic device according to the present invention, preferably, the one end of the first housing provided with the inlet and the outlet is an end side provided with the linkage section on the first housing.

The inlet and the outlet are provided on the end side of the first housing, to which end side the linkage section is attached, so that the structure of the second housing that divides the inlet and the outlet can be readily realized.

In the electronic device according to the present invention, preferably, the first housing is a main section of the electronic device containing a main processing circuit and a cooling fan that cools the main processing circuit using the inlet and the outlet; and the second housing is a display section of the electronic device that displays a result of processing by the main processing circuit.

For the electronic device including the main section having the main processing circuit and the display section, downsizing of the apparatus and improvement of heat release efficiency are strongly demanded. Therefore, the electronic device of the present invention can produce great effects.

The electronic device according to the present invention preferably further includes a keyboard on a top surface of the first housing.

According to this additional feature, heat generated in a device such as a personal computer provided with the keyboard can be efficiently released.

As described above, according to the electronic device of the present invention, it is possible to downsize the apparatus while improving its heat release efficiency.

DETAILED DESCRIPTION OF THE INVENTION

Embodiments of the basic feature and its variations of the present invention will be described with reference to the drawings.

Figure 1:
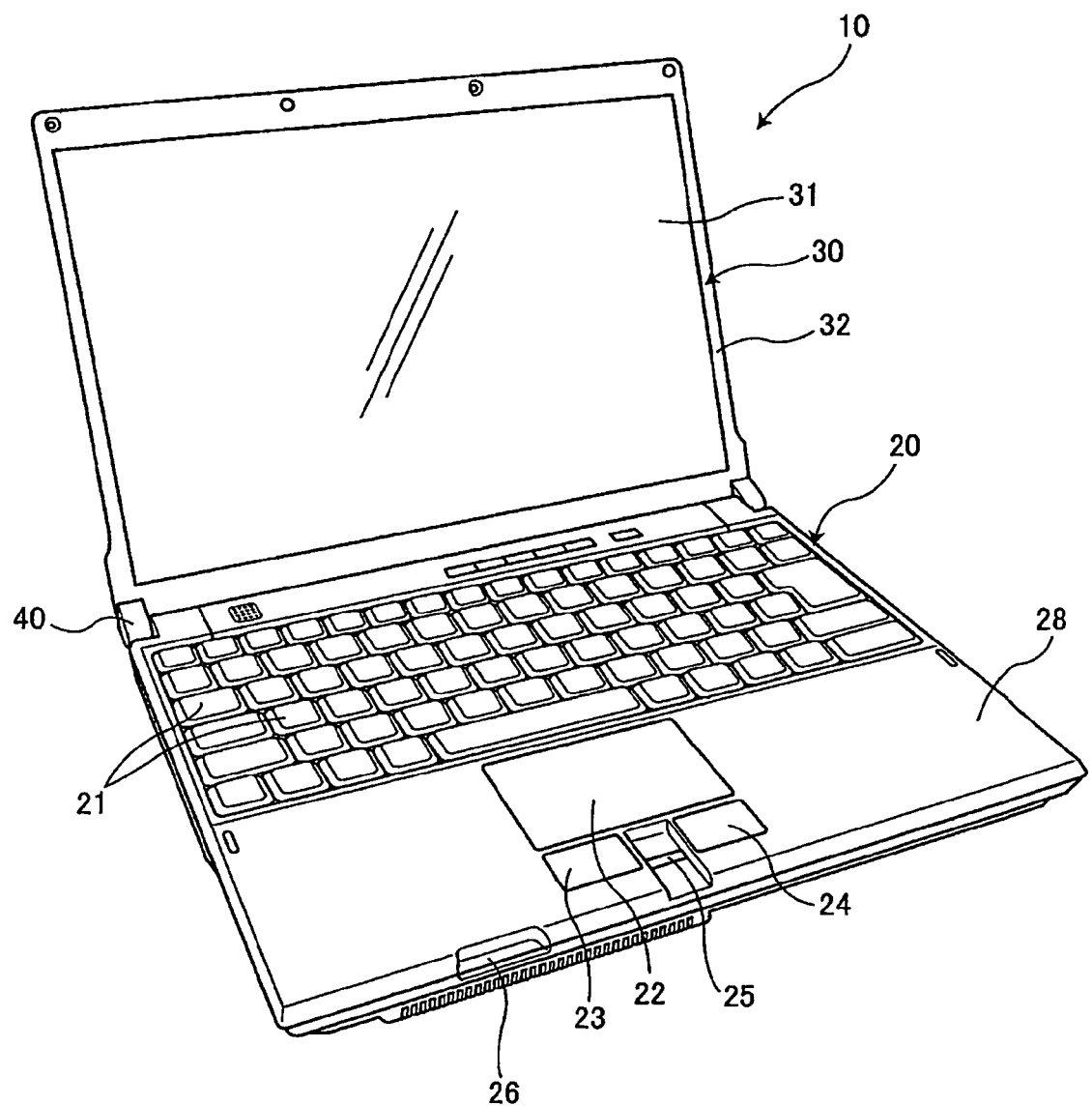
FIG. 1 is an outline view of a personal computer being a first embodiment of an electronic device.

FIG. 1 is an outline view of a personal computer 10 being a first embodiment of the electronic device.

A personal computer 10 includes a main unit 20 and a display unit 30. The display unit 30 is linked to the main unit 20 by a hinge section 40 such that the unit 30 can be opened/closed. The main unit 20 represents one example of the main section according to the present invention. The display unit 30 represents one example of the display section according to the present invention. The hinge section 40 represents one example of the linkage section according to the present invention. FIG. 1 shows a front-view diagram of the personal computer 10 in a state of the display unit 30 being opened.

The main unit 20 is to execute various information processing; a main housing 28 houses a CPU, a hard disk device and the like. The main housing 28 includes a keyboard 21, a track pad 22, a left-click button 23, a right-click button 24 and the like on the top surface. On the front of the main housing 28, there are further provided a fingerprint sensor 25 that performs fingerprint authentication by tracing with a fingertip and a medium loading aperture 26 that loads a small recording medium. The main housing 28 represents one example of the first housing according to the present invention.

The display unit 30 displays a result of the information processing executed in the main unit 20; a display housing 32 houses a flat LCD panel, a control circuit for the LCD panel, a communication antenna and the like. The display housing 32 includes a front cover 32A and a rear cover 32B (see FIG. 2). The LCD panel is held from backward and forward by the rear cover 32B and the front cover 32A, while a display screen 31 is provided in the front. The display housing 32 represents one example of the second housing according to the present invention. The display unit 30 is a wide-type display device, in which various electronic components are arranged on the back side instead of a lateral side of the LCD panel so that the display screen 31 extends to the vicinity of side surfaces of the display housing 32.

Figure 2:
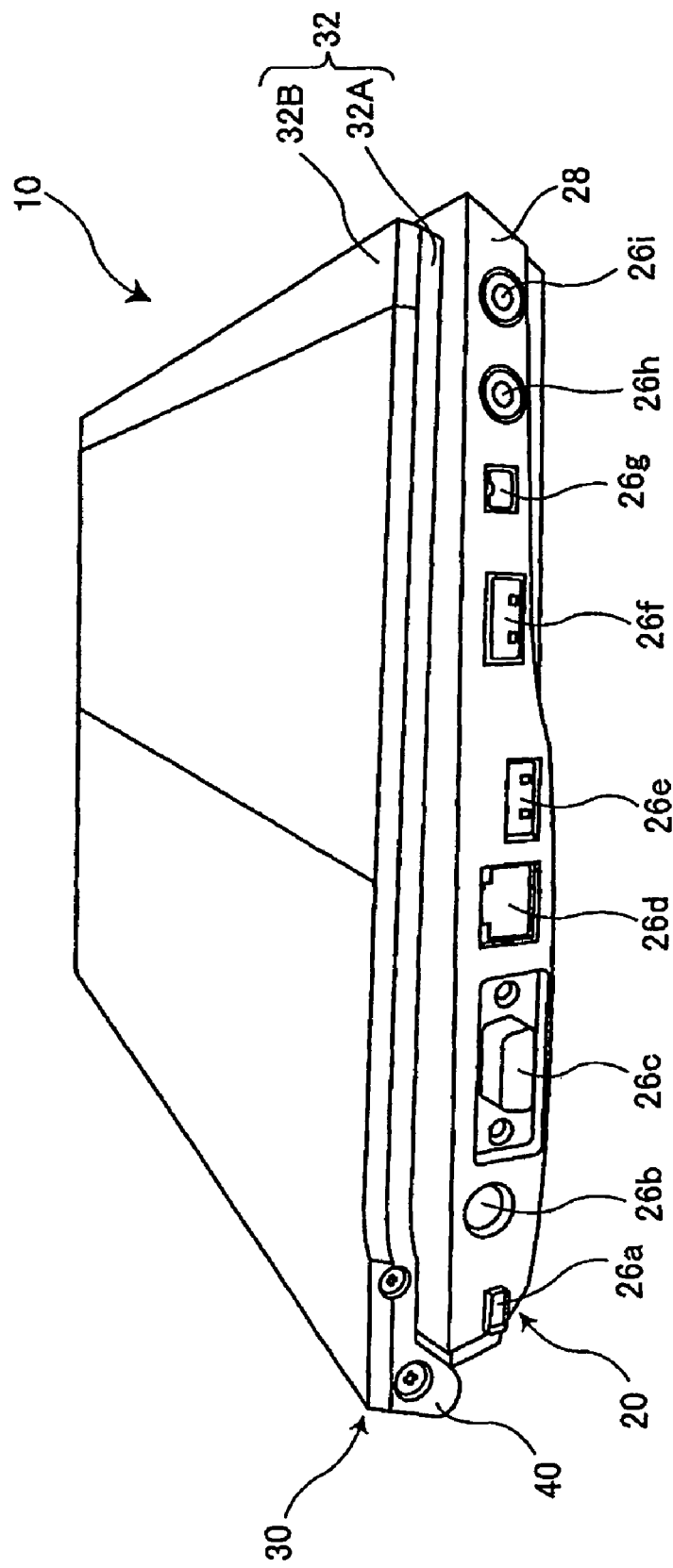
FIG. 2 is a diagram showing one lateral side of the personal computer.

FIG. 2 is a diagram showing one lateral side of the personal computer 10.

On one side of the main unit 20, there are provided a security slot 26a for a wire cable lock, a connector 26b for a power-supply module, a connector 26c for an external monitor, a connector 26d for a LAN cable, connectors 26e and 26f for USB, a connector 26g for an audio jack, a connector 26h for a microphone, a connector 26i for a headphone and the like.

Figure 3:
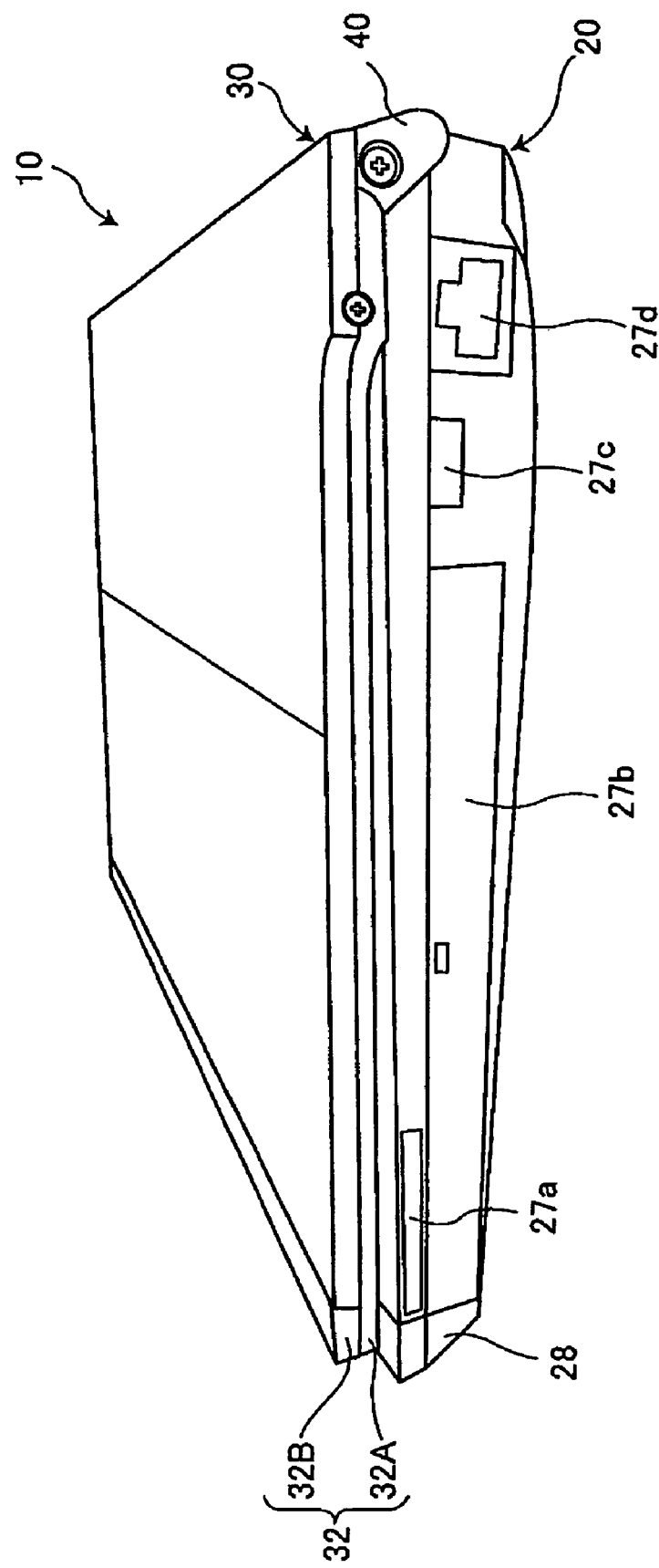
FIG. 3 is a diagram showing a side opposite to that of the personal computer in FIG. 2.

FIG. 3 is a diagram showing a side opposite to that of the personal computer 10 in FIG. 2.

On the side of the main unit 20 opposite to that in FIG. 2, there are provided an expansion card loading aperture 27a that loads an expansion card for function expansion such as a LAN card, an optical disc loading aperture 27b that loads an optical disc such as a CD or DVD, a USB connector 27c, and a modem connector 27d.

Subsequently, the internal configuration of the personal computer 10 will be described.

Figure 4:
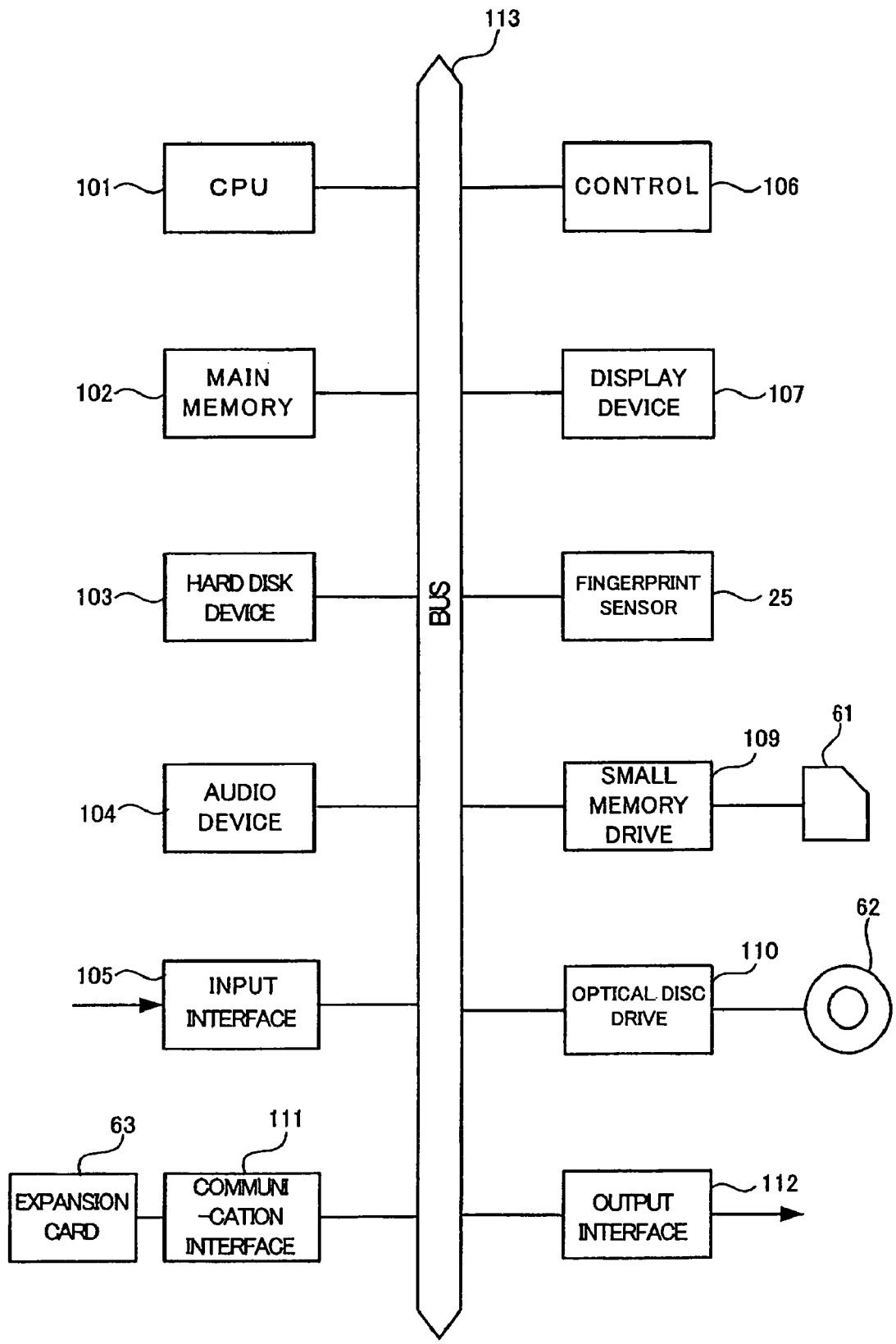
FIG. 4 is an internal block diagram of the personal computer.

FIG. 4 is an internal block diagram of the personal computer 10.

The personal computer 10 includes, as shown in FIG. 4: a CPU 101 that executes various programs; a main memory 102 from which a program stored in a hard disk device 103 is read out and deployed for execution on the CPU 101; the hard disk device 103 that stores the various programs, data and the like; an audio device 104 equipped with a microphone, a speaker and the like; an input interface 105 that inputs data from an external apparatus; a control 106 including the keyboard 21, the track pad 22 and the like; a display device 107 that displays information on the display screen 31; the fingerprint sensor 25 also shown in FIG. 1; a small memory drive 109 to load a small recording medium 61 and access the loaded small recording medium 61; an optical disc drive 110 to load a CD-ROM 62 or a DVD and access the loaded CD-ROM 62 or DVD; a communication interface 111 that performs communication using an expansion card 63; and an output interface 112 that outputs data to an external apparatus. These various elements are built in the computer 10 and connected to one another via a bus 113.

Multiple efforts are made on the personal computer 10 of this embodiment to provide reduction in size and weight, improvement of strength, and improvement of operability of the apparatus. First, the effort to improve the strength of the personal computer 10 will be described.

Figure 5:
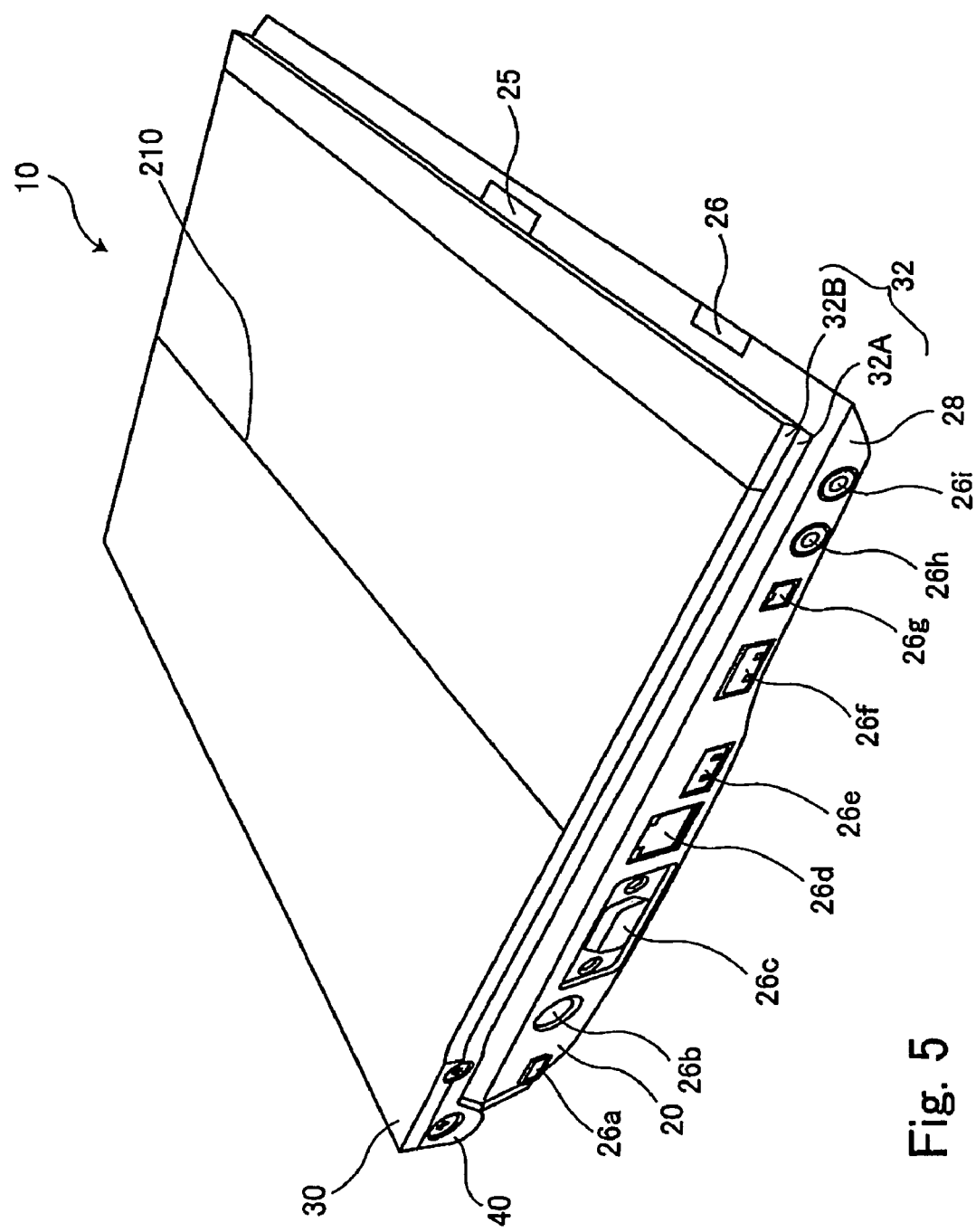
FIG. 5 is a diagram showing a state of a display unit being in the closed position relative to a main unit.

FIG. 5 is a diagram showing a state of the display unit 30 being in the closed position relative to the main unit 20.

As shown in FIG. 5, on the rear cover 32B of the display housing 32, there is provided a convex portion 210 formed by folding a plate member in the center part in the cross direction of the personal computer 10. The convex portion 210, for which hood structure of an automobile is employed, extends between both lateral sides of the display housing 32 in the longitudinal direction of the personal computer 10. The convex portion 210 represents one example of the convex portion according to the present invention.

The rear cover 32B is provided with the convex portion 210 so that the flexion of the rear cover 32B reduces, improving the strength of the display housing 32. In this manner, according to this embodiment, a thin and light-weighted material can be used to form the highly strong display housing 32, so that reduction in weight and improvement in strength of the apparatus can be both achieved. Furthermore, the convex portion 210 extends in the longitudinal direction of the display housing 32 to link the both lateral sides, so that the strength of the display housing 32 can be sufficiently improved even without providing multiple convex portions 210, allowing flexibility in design.

Figure 6:
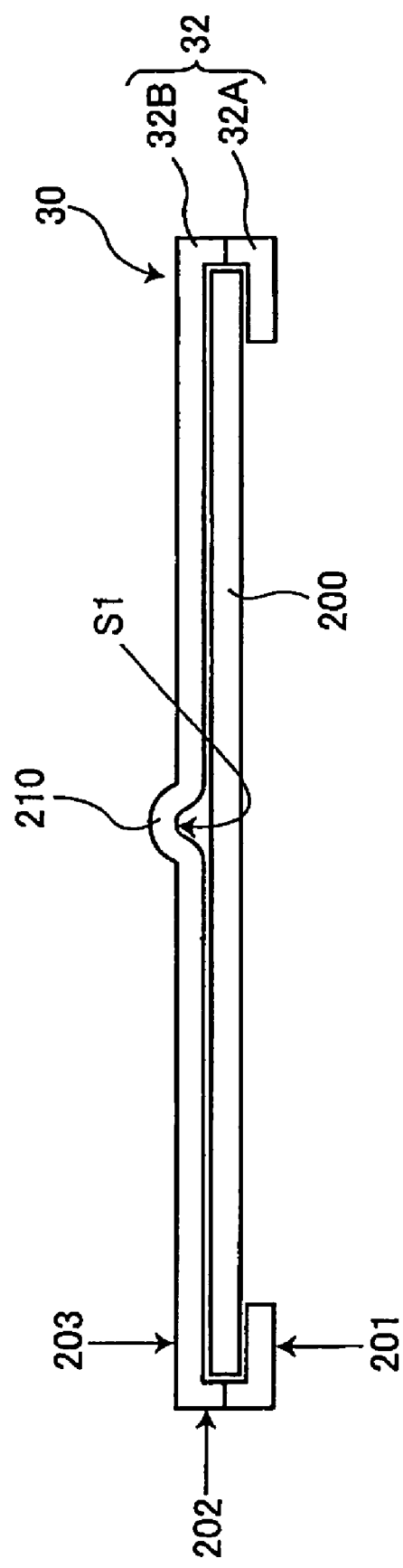
FIG. 6 is a cross-sectional view of the display unit being cut across the surface being vertical to the longitudinal direction of the personal computer.

FIG. 6 is a cross-sectional view of the display unit 30 being cut across the surface being vertical to the longitudinal direction of the personal computer 10.

The display housing 32 includes the front cover 32A and the rear cover 32B. The display housing 32 includes: a front section 201 that covers an edge of the front side of an LCD panel 200 on which the display screen 31 is provided; a back section 203 that covers the back side of the LCD panel 200; and a lateral section 202 that links the front section 201 and the back section 203. The LCD panel 200 represents one example of the glass assembly part according to the present invention and also represents one example of the display panel according to the present invention. The front section 201 represents one example of the front section according to the present invention. The lateral section 202 represents one example of the side wall part according to the present invention. The back section 203 represents one example of the back section according to the present invention.

The center part of the back section 203 is a part that bends most largely when a shock is applied due to falling or the like. However, according to this embodiment, the convex portion 210 is provided in the center part that bends largely, thereby efficiently improving the strength of the display housing 32. For the personal computer 10, the space between the LCD panel 200 and the display housing 32 is reduced for the purpose of downsizing the apparatus, but the convex portion 210 of the display housing 32 is formed by folding, so that a gap S1 is formed between the surface of the convex portion 210 and the LCD panel 200. Accordingly, even if the display housing 32 bends due to a considerable shock on the personal computer 10, the convex portion 210 can be prevented from colliding against the LCD panel 200 and the gap S1 can absorb the shock so that the LCD panel 200 can be prevented from being damaged.

As described above, for the personal computer 10 according to this embodiment, a light-weighted and thin material can be used to form the highly strong display housing 32, weight reduction and improvement in strength of the apparatus can be both achieved.

Subsequently, a second effort to improve the strength of the personal computer 10 will be described.

For the personal computer 10, the flat LCD panel 200 is used as the display device 107 and the space between the display housing 32 and the LCD panel 200 is reduced to decrease the size of the apparatus while increasing the size of the display screen 31. However, an LCD panel, in which LCD elements are enclosed between glass panels, easily breaks with a shock due to such as falling. Further, a wide-type display device in which a display screen extends to the vicinity of side surfaces of a display housing has a problem in that the shock due to falling is not absorbed but easily affects the LCD panel directly. An effort is made on the personal computer 10 to alleviate such a drawback that the LCD panel 200 is damaged because of the shock due to falling.

Figure 7:
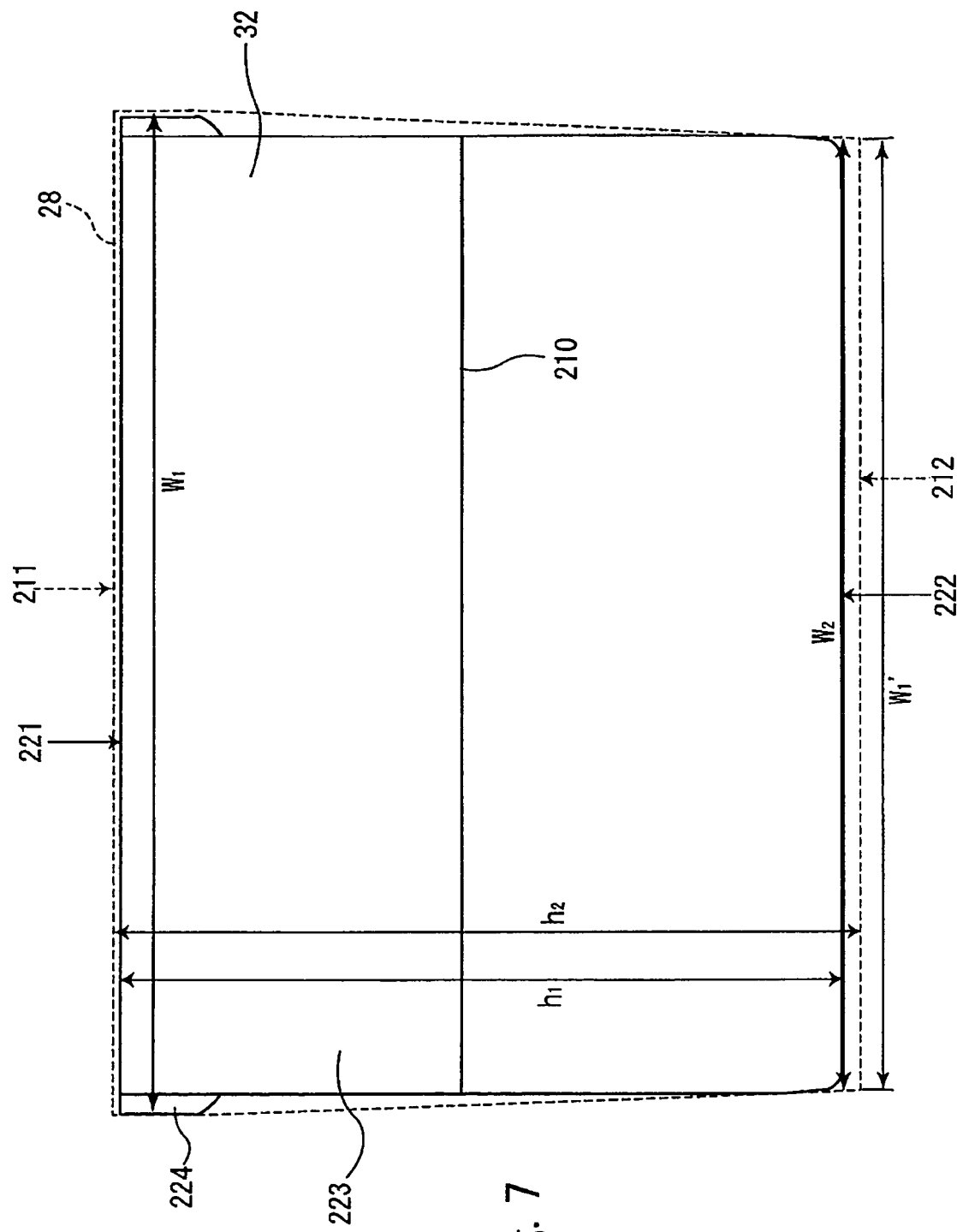
FIG. 7 is a diagram illustrating sizes of a display housing and a main housing.

FIG. 7 is a diagram illustrating sizes of the display housing 32 and the main housing 28.

FIG. 7 shows an outline of the main housing 28 by dotted lines. In the main housing 28, a rear section 211 attached with the hinge section 40 is parallel to a forward section 212, and the width w1' of the forward section 212 is narrower than the width w1 of the rear section 211. That is, the housing 28 has a trapezoidal shape as viewed from above. The main housing 28 represents one example of the first housing according to the present invention. The rear section 211 represents one example of the first side part according to the present invention. The forward section 212 represents one example of the second side part according to the present invention.

On the display housing 32, the width of a rear section 221 attached with the hinge section 40 equals the width w1 of the rear section 211 of the main housing 28, and the width w2 of the forward section 222 is narrower than the width w1 of the rear section 221. The width w2 of the forward section 222 of the display housing 32 is the same as that of the forward section 222 of the main housing 28. The length h1 of the display housing 32 in the cross direction is made shorter than the length h2 of the main housing 28 in the cross direction. The display housing 32 represents one example of the second housing according to the present invention. The forward section 222 represents one example of the third side part according to the present invention. The rear section 221 represents one example of the fourth side part according to the present invention. A region between the forward section 222 and the rear section 221 represents one example of the side part according to the present invention.

Additionally, over the display housing 32, there is provided a rectangular region 223 that has the same width as the width w2 of the forward section 222, and a projecting part 224 that projects in the width direction on the rear of the rectangular region 223. The rectangular region 223 represents one example of the rectangular region according to the present invention. A forward part of the rectangular region 223, which part is closer to the front than the projecting section 224 is, represents one example of the first side part according to the present invention. The combination of a backward part of the rectangular region 223, which part is closer to the back than the projecting section 224 is, and the projecting section 224 represents one example of the second side part according to the present invention.

Figure 8:
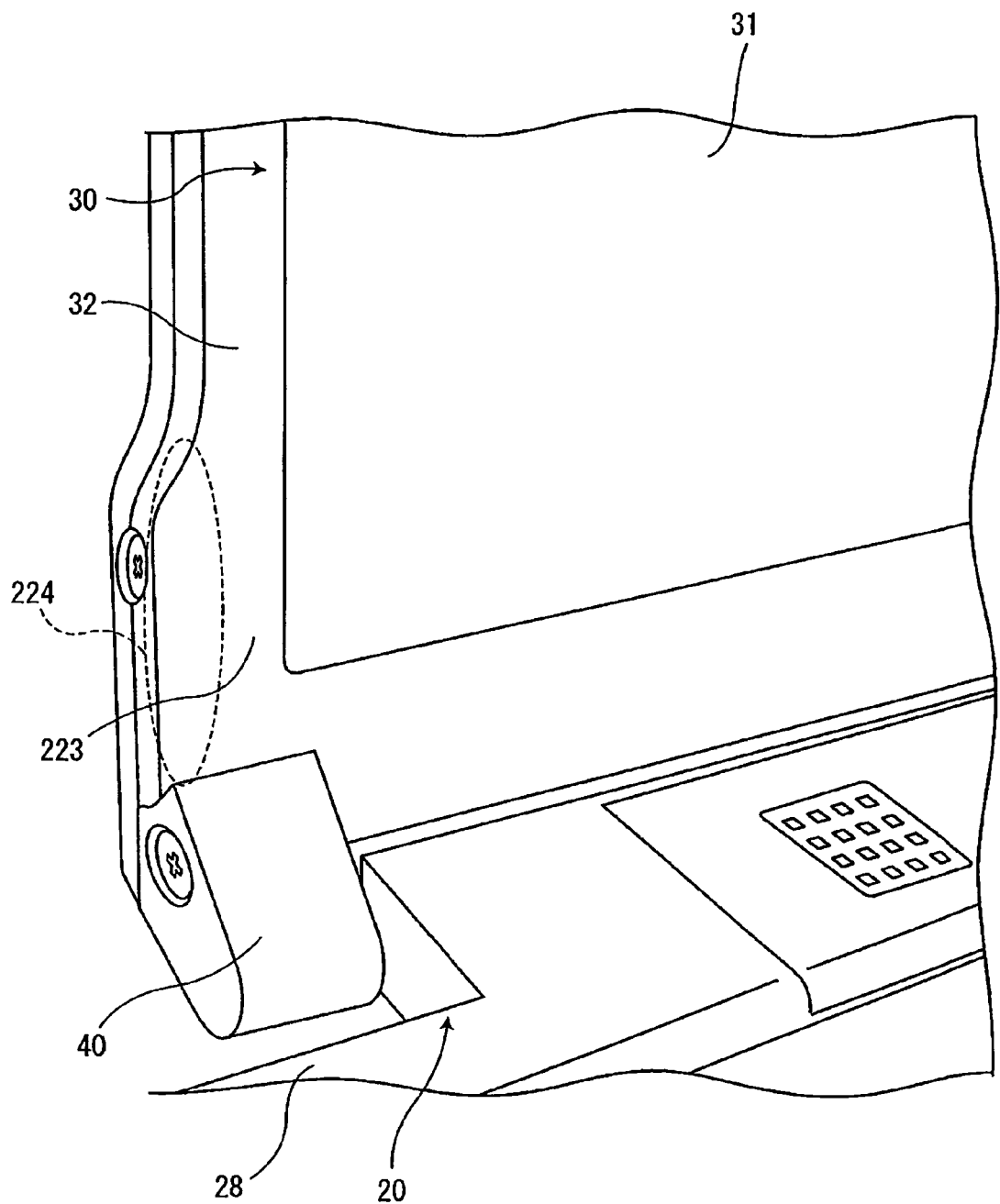
FIG. 8 is an enlarged view in the vicinity of a projecting section in a state of the display housing being in the open position relative to the main housing.
Figure 9:
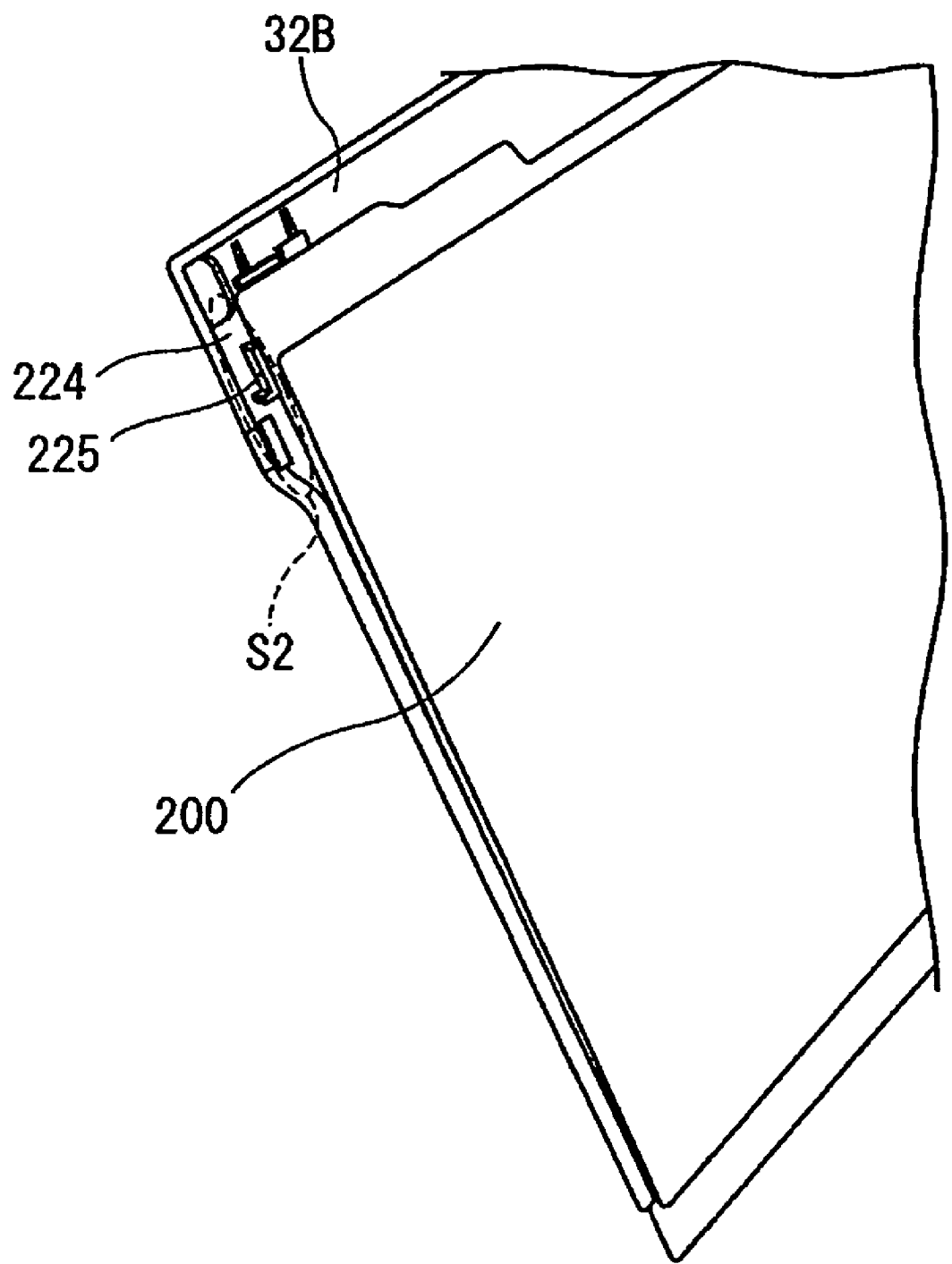
FIG. 9 is a diagram showing a state of a front cover of the display housing being removed.

FIG. 8 is an enlarged view in the vicinity of the projecting section 224 in a state of the display housing 32 being in the open position relative to the main housing 28. FIG. 9 is a diagram showing a state of the front cover 32A of the display housing 32 being removed.

As shown in FIG. 8, on the display housing 32, a side provided with the projecting section 224 is linked to the hinge section 40, so that only the projecting section 224 projects in the width direction. As shown in FIG. 9, the rear cover 32B of the display housing 32 is provided with a rib 225 within the rectangular region 223 shown in FIG. 7, with a small gap formed against the rear cover 32B. The rib 225 holds the LCD panel 200. The rib 225 is provided so that the display housing 32 can easily house the LCD panel 200, reducing production labor. The rib 225 represents one example of the rib according to the present invention. On a side attached with the hinge section 40, a relatively wider gap S2 is provided between the display housing 32 and the LCD panel 200, since the projecting section 224 is provided.

In the personal computer 10, the eccentricity of center of gravity is biased toward a side provided with the hinge section 40. Therefore, when the personal computer 10 is dropped, usually, a shock is applied to the hinge section 40 first since the hinge section 40 is in the lowermost position while the personal computer 10 is falling. However, the shock is absorbed by the gap S2 between the display housing 32 and the LCD panel 200, reducing the damage to the LCD panel 200. In the personal computer 10 according to this embodiment, only a side provided with the hinge section 40 is formed to be large in width, minimizing enlargement and weight increase of the apparatus.

As described above, in the personal computer 10 according to this embodiment, the large gap S2 is provided between the display housing 32 and the LCD panel 200 only on the side attached with the hinge section 40, thereby preventing the damage to the LCD panel 200 while limiting enlargement of the apparatus.

Subsequently, an effort to downsize the personal computer 10 will be described.

As described with reference to FIG. 7, for the main housing 28 of the personal computer 10, the rear section 211 attached with the hinge section 40 is larger in width than the forward section 212, so that the housing 28 has a trapezoidal shape as viewed from above.

Figure 10A:
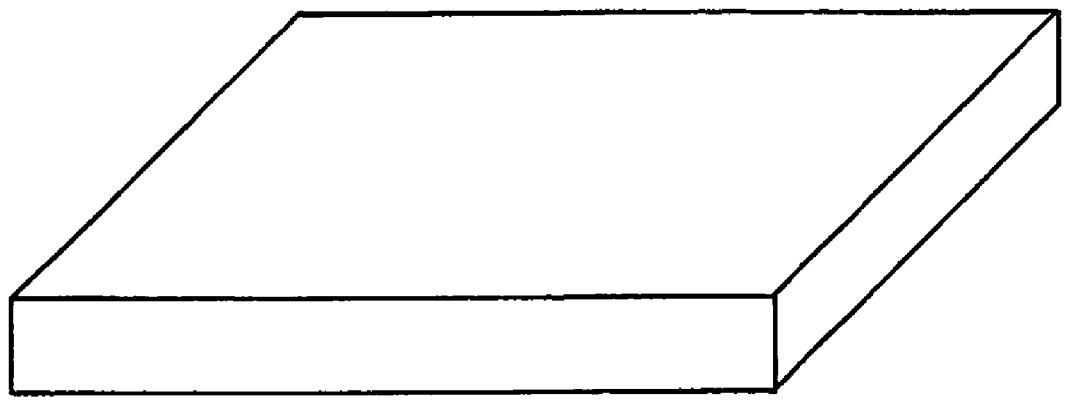
FIGS. 10(A) and (B) are diagrams showing the relation between the form of the main housing and the impression of the appearance.

FIGS. 10(A) and (B) are diagrams showing the relation between the form of the main housing 28 and the impression of the appearance.

Figure 10B:
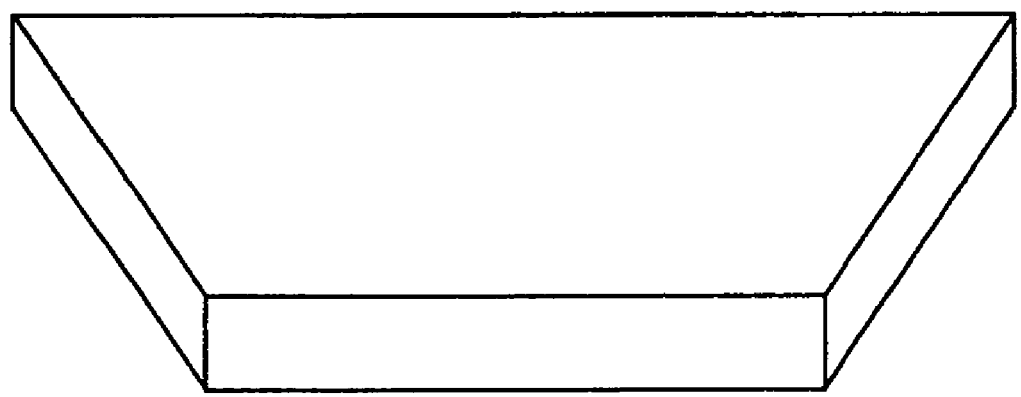

FIG. 10(A) shows a rectangular parallelepiped, while FIG. 10(B) shows a solid of which top surface and bottom surface are trapezoids and which has the same volume as the rectangular parallelepiped shown in FIG. 10(A). As shown in FIG. 10(B), when the solid is arranged with the shorter side of the trapezoid in front, it tends to appear to be smaller than the rectangular parallelepiped of the same volume shown in FIG. 10(A).

On the personal computer 10 according to this embodiment, the hinge section 40 is attached to the longer side of the trapezoid. As such, when a user uses the computer 10, the personal computer 10 is placed with the shorter side of the trapezoid in front. Therefore, it can be seen as smaller than a conventional rectangular parallelepiped apparatus with the same volume.

Figure 11:
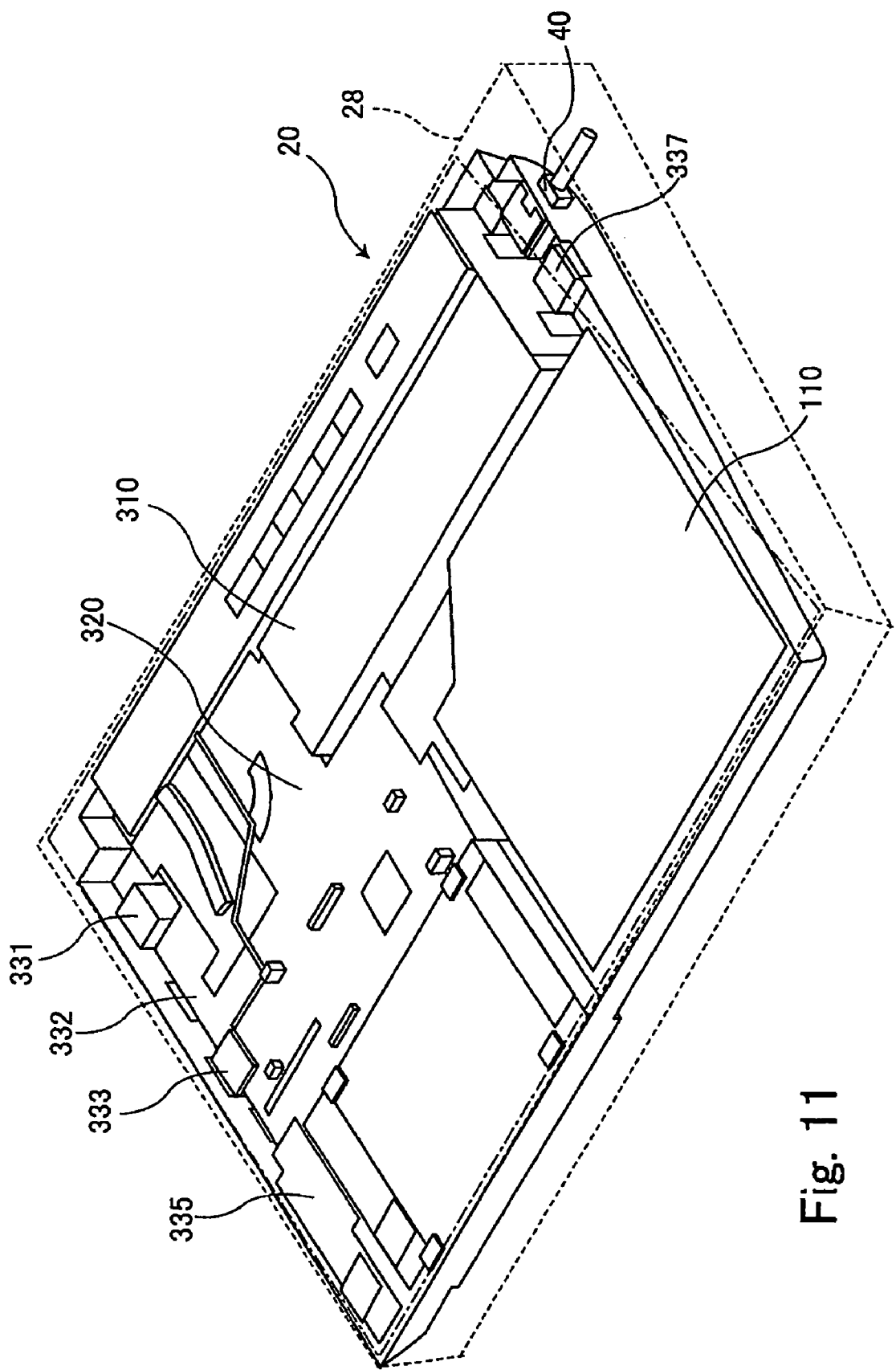
FIG. 11 is an internal structural diagram of the main unit.

FIG. 11 is an internal structural diagram of the main unit 20.

FIG. 11 shows an outline of the main housing 28 by dotted lines, and shows a rectangular region having the same width as the shorter side of the trapezoid of the main housing 28 by alternate long and shot dashed lines. As shown in FIG. 11, the main housing 28 houses: a power-supply control circuit 331 connected to the connector 26b for the power-supply module shown in FIG. 2; a display control circuit 332 connected to the connector 26c for an external monitor; a communication control circuit 333 connected to the connector 26d for a LAN cable, an input/output control circuit (not shown in FIG. 11) connected to the USB connectors 26e, 26f and 27c; an audio circuit 335 connected to the connector 26g for an audio jack, the connector 26h for a microphone, and the connector 26i for a headphone; an expansion processing circuit (not shown in FIG. 11) connected to the expansion card loading aperture 27a shown in FIG. 3; the optical disc drive 110 connected to the optical disc loading aperture 27b; and a data conversion circuit 337 connected to the connector 27d for a modem, as well as various electronic components such as a cooling mechanism 320 that releases heat generated in the main housing 28 or a rechargeable battery 310. The various electronic components shown in FIG. 11 represent one example of the processing circuit according to the present invention, and represent one example of the electronic component according to the present invention.

As shown in FIG. 11, the back of the main housing 28 attached with the hinge section 40 has more space than the front. As such, a space to absorb a shock can be provided between the main housing 28 and the hinge section 40 on the back to improve the shock resistance of the personal computer 10. The data conversion circuit 337 and the like as some of the various electronic components shown in FIG. 11 are arranged in the outside of the rectangular region indicated by alternate long and short dashed lines of the main housing 28. The electronic components are arranged in the back space of the main housing 28, so that the width of the front of the main housing 28 can be made narrower, thereby making the appearance of the personal computer 10 further smaller.

As described above, the main housing 28 is formed to be of a trapezoidal shape with narrower front width, so that the apparatus can appear smaller even with increased capacity of the main housing 28.

Subsequently, an effort to downsize the cooling mechanism 320 shown in FIG. 11 will be described.

Figure 12:
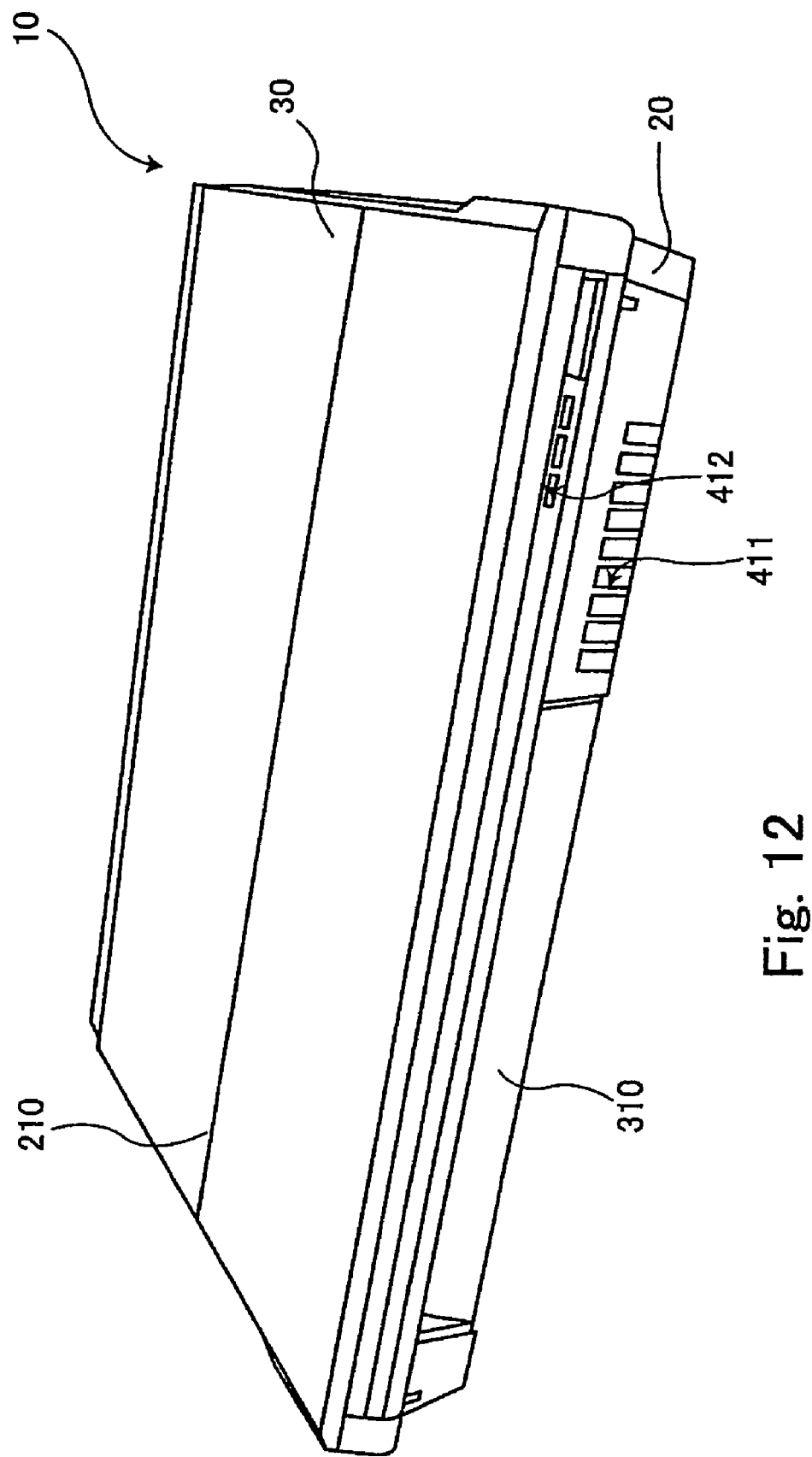
FIG. 12 is a back view of the personal computer in a state of the display unit being in the closed position relative to the main unit.

FIG. 12 is a back view of the personal computer 10 in a state of the display unit 30 being in the closed position relative to the main unit 20.

On the back surface of the personal computer 10, the rechargeable battery 310 also shown in FIG. 11 is inlayed into the main unit 20, and an inlet 412 and outlet 411 are provided that are part of the cooling mechanism 320. The inlet 412 is provided above the outlet 411, so that it is possible to alleviate such a malfunction that the inlet 412 takes in the heat remaining around the bottom of the personal computer 10, maintaining heat release efficiency during continuous use of the personal computer 10.

Figure 13:
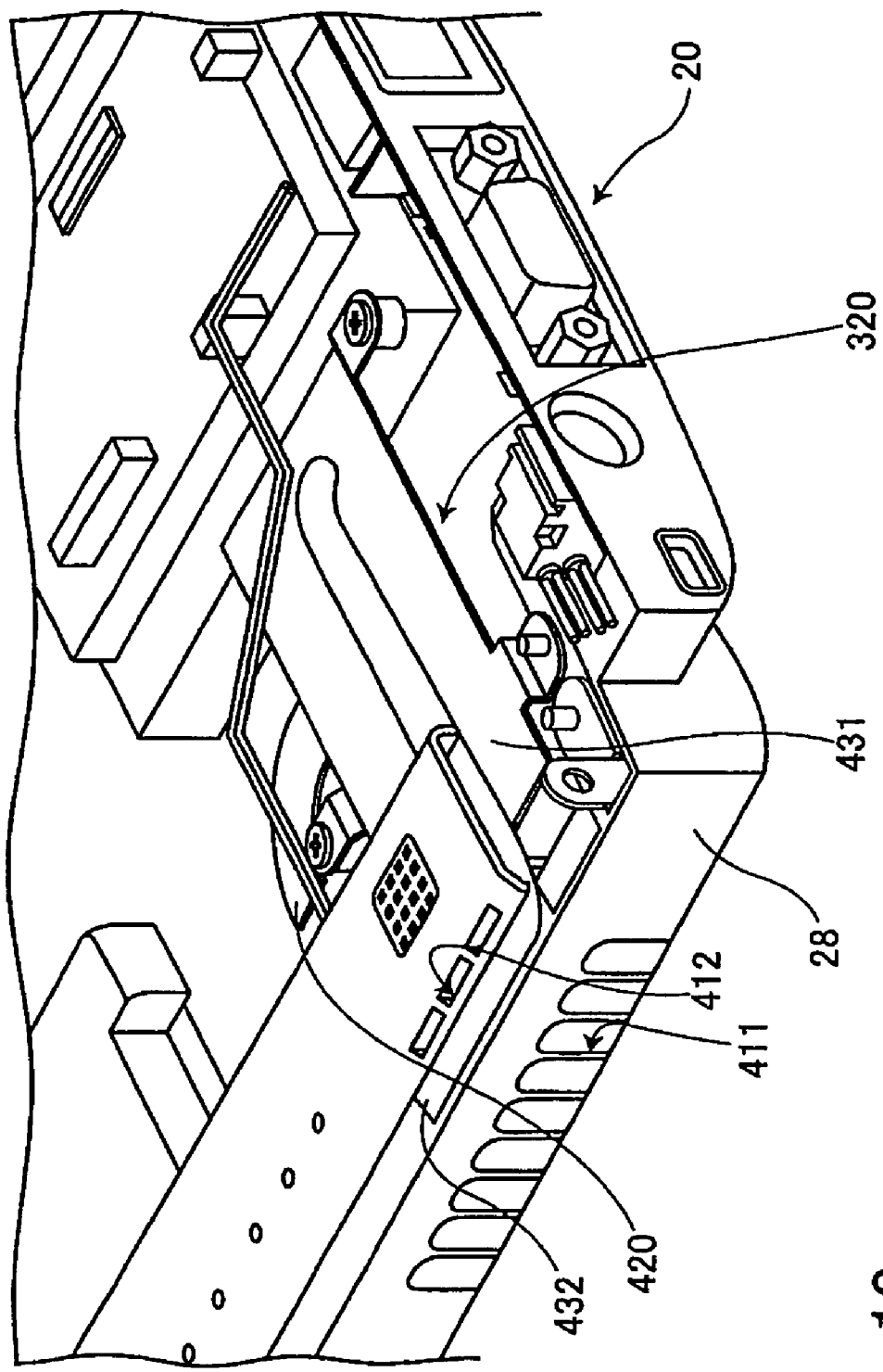
FIG. 13 is an internal structural diagram in the vicinity of a cooling mechanism of the main unit.

FIG. 13 is an internal block diagram in the vicinity of the cooling mechanism 320 of the main unit 20.

As shown in FIG. 13, the cooling mechanism 320 includes, for example: a plate 431 that is positioned on electronic components and to which heat generated from the electronic components is conducted; a heat pipe 432 that is attached to the plate 431 and conducts the heat conducted to the plate 431 to the outlet 411; a cooling fan 420 for exhausting the heat conducted through the heat pipe 432 with air. The cooling fan 420 represents one example of the cooling fan according to the present invention.

Figure 14:
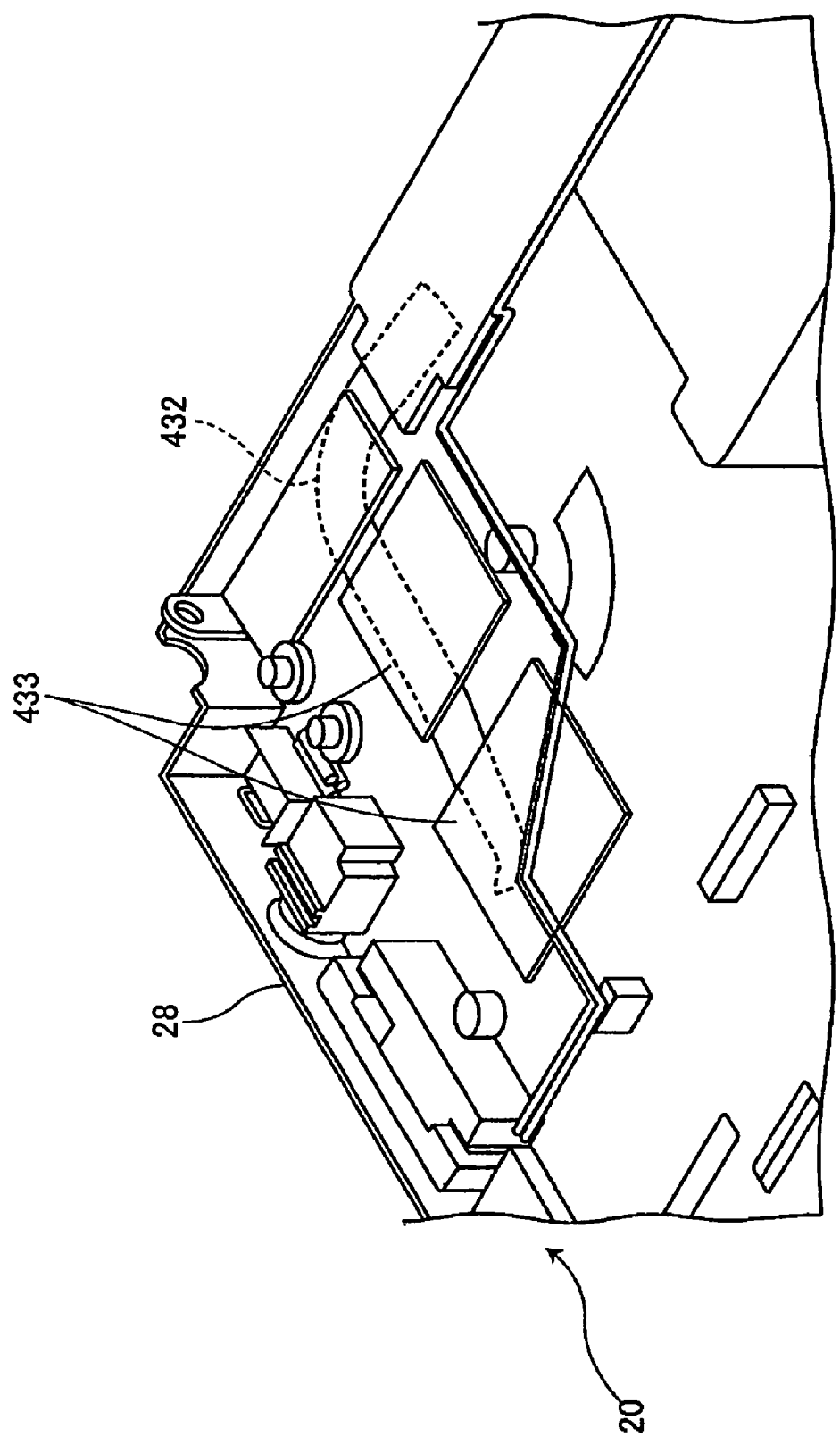
FIG. 14 is a perspective diagram showing electronic components being housed below a plate shown in FIG. 13.

FIG. 14 is a perspective diagram showing electronic components being housed below the plate 431 shown in FIG. 13. In FIG. 14, the same portion as that shown in FIG. 13 is turned upside down.

The heat pipe 432 extends to the vicinity of the outlet 411 that links positions on processing circuits 433 equipped with a CPU and a controller on the plate 431.

Figure 15:
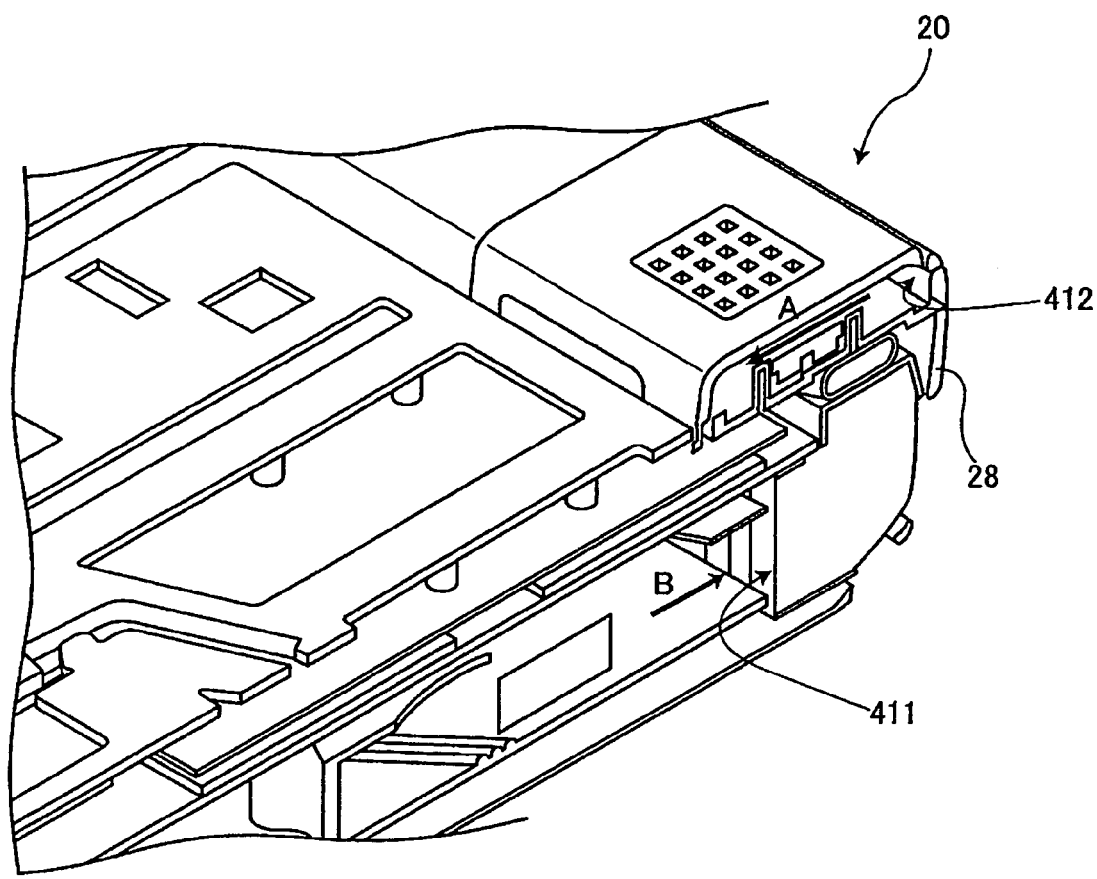
FIG. 15 is a diagram showing an airway.

FIG. 15 is a diagram showing an airway.

The air taken in from the inlet 412 is sent into the main housing 28 as shown by an arrow A. The heat generated in the processing circuits 433 shown in FIG. 14 is conducted to the plate 431 and conducted to the vicinity of the outlet 411 through the heat pipe 432. The cooling fan 420 sends out the air taken in from the inlet 412 to the outlet 411. The air absorbs the heat conducted through the heat pipe 432, so that the warm air is exhausted from the outlet 411 as shown by an arrow B. In this manner, in the personal computer 10 according to this embodiment, the inlet 412 and the outlet 411 are provided on the same surface of the main housing 28, so that the heat pipe 432 and the cooling fan 420 can be compactly housed, thereby downsizing the whole apparatus.

Figure 16:
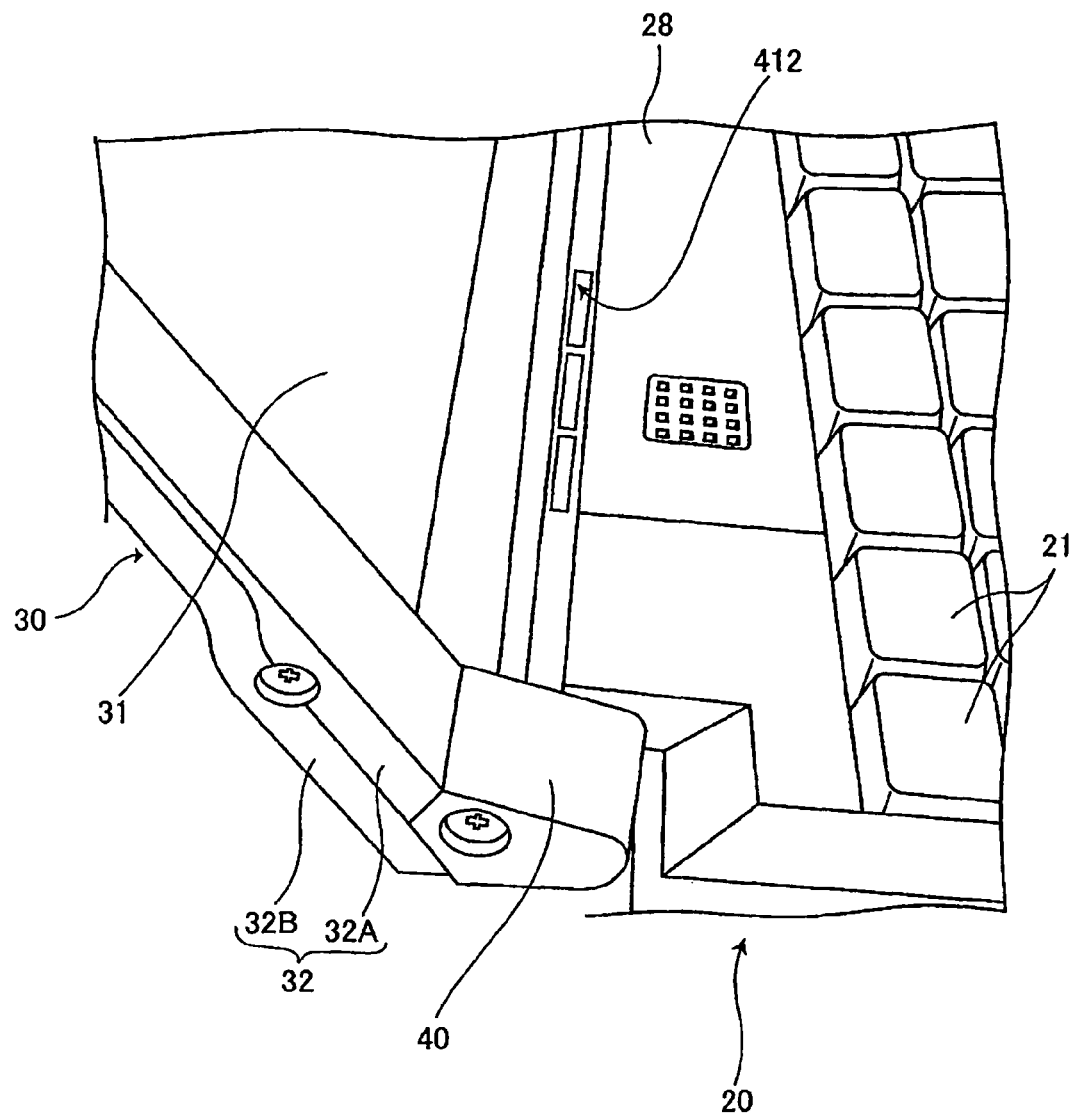
FIG. 16 is a front view of the personal computer in a state of the display unit being in the open position relative to the main unit.
Figure 17:
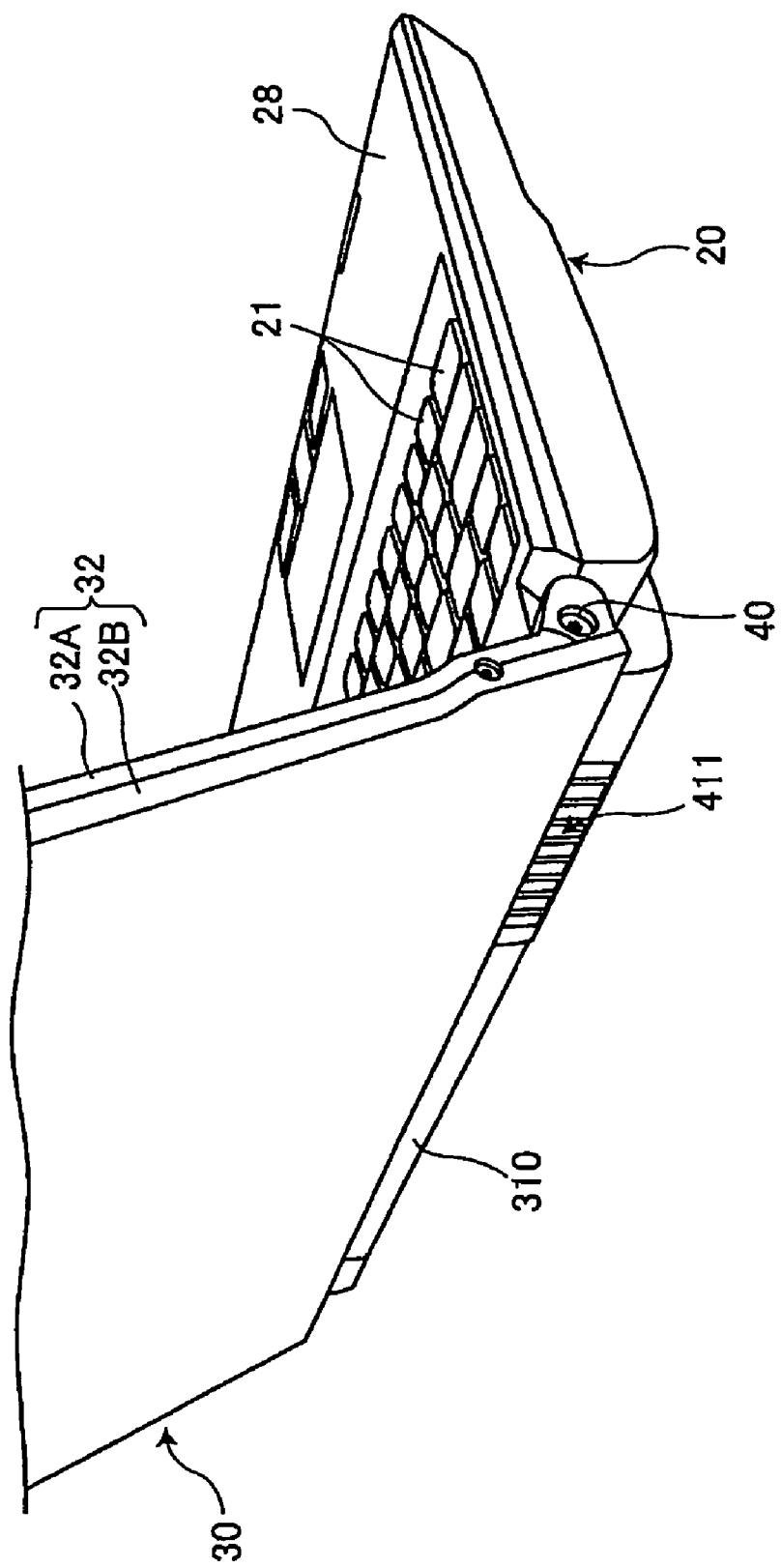
FIG. 17 is a back view of the personal computer in the state of the display unit being in the open position relative to the main unit.

FIG. 16 is a front view of the personal computer 10 in a state of the display unit 30 being in the open position relative to the main unit 20. FIG. 17 is a back view of the personal computer 10 in the state of the display unit 30 being in the open position relative to the main unit 20.

In the state of the display unit 30 being opened, the inlet 412 is positioned in front of the display unit 30, as shown in FIG. 16, while the outlet 411 is positioned in the rear of the display unit 30, as shown in FIG. 17. When the inlet and the outlet are merely provided on the same surface of the housing, the inlet draws warm air exhausted from the outlet into the housing, thereby declining heat release efficiency. However, on the personal computer 10 according to this embodiment, the display unit 30 divides a space between the inlet 412 and the outlet 411, maintaining heat release efficiency.

As shown in FIG. 12, also in the state of the display unit 30 being closed, the inlet 412 is exposed on an external surface of the personal computer 10. As such, the inlet 412 can take in air even if the display unit 30 is closed, so that heat generated while running in the state of the display unit 30 being closed can be surely released to the outside of the main housing 28.

As described above, the personal computer 10 according to this embodiment can provide both downsizing and improvement of heat release efficiency of the apparatus.

Subsequently, an effort to improve the operability of the personal computer 10 will be described.

In the case of a laptop personal computer, the personal computer is operated not only in a state of being placed such as on a desk, but the personal computer is also operated being held by one hand. For the personal computer 10 according to this embodiment, an effort is made to open/close the display unit 30 quickly and easily in such a usage style.

Figure 18:
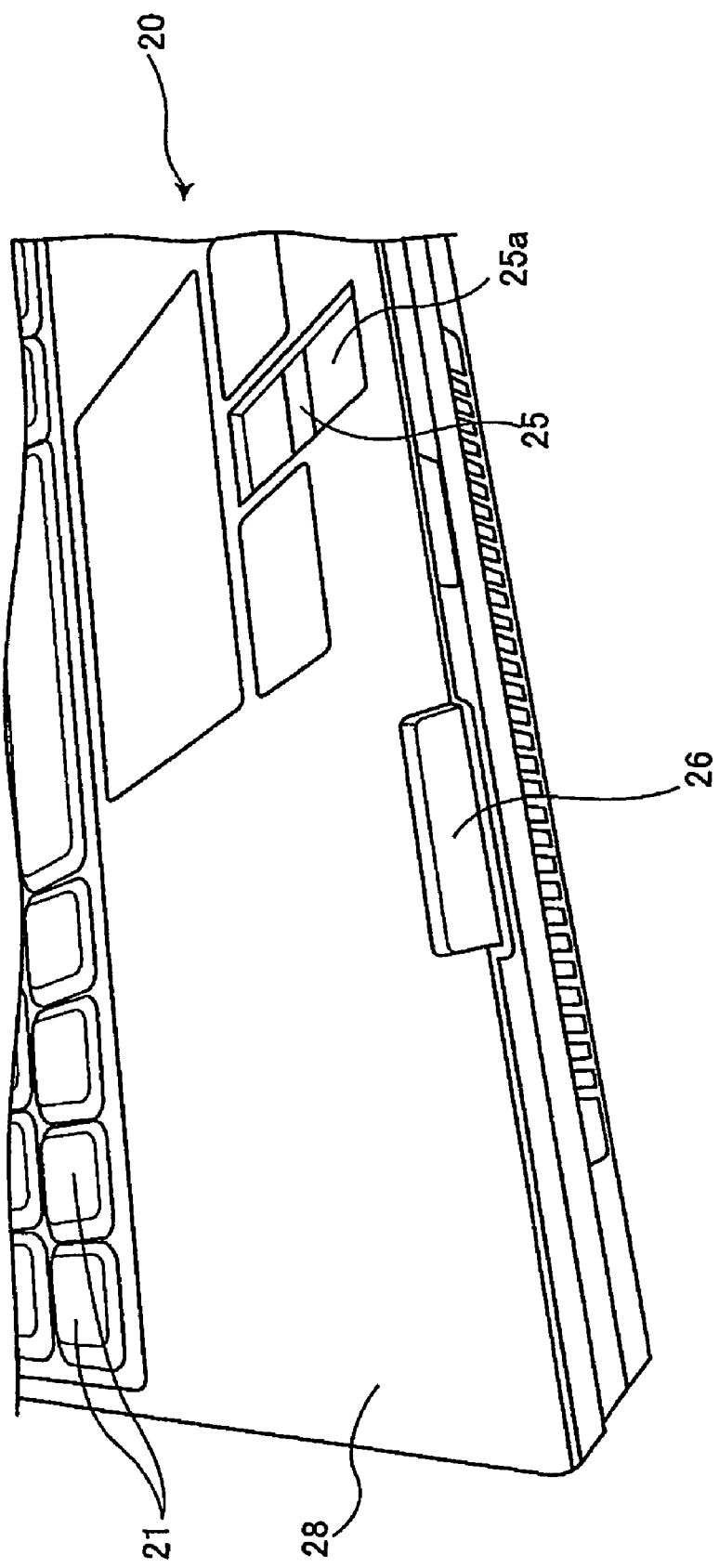
FIG. 18 is an enlarged view showing the vicinity of a front end of the main unit.

FIG. 18 is an enlarged view showing the vicinity of a front end of the main unit 20.

In the front of the main unit 20, there are provided the fingerprint sensor 25 and the medium loading aperture 26. The fingerprint sensor 25 is provided with a guide 25a for guiding a finger to the fingerprint sensor 25. The main housing 28 has a cavity around the part being provided with the medium loading aperture 26 and the guide 25a. The medium loading aperture 26 and the guide 25a represent one example of the cavity according to the present invention. The fingerprint sensor 25 represents one example of the fingerprint sensor according to the present invention. The guide 25a represents one example of the guide in fingerprint read operation according to the present invention.

As shown in FIG. 7, the length h2 in the cross direction of the main housing 28 is longer than the length h1 of the display housing 32. As such, even if the display housing 32 is closed, the medium loading aperture 26 and the guide 25a are exposed on the surface of the personal computer 10. The forward section 212 of the main housing 28 also represents one example of the first front end according to the present invention. The rear section 211 also represents one example of the first back end according to the present invention. The forward section 222 of the display housing 32 also represents one example of the second front end according to the present invention. The rear section 221 also represents one example of the second back end according to the present invention.

Figure 19:
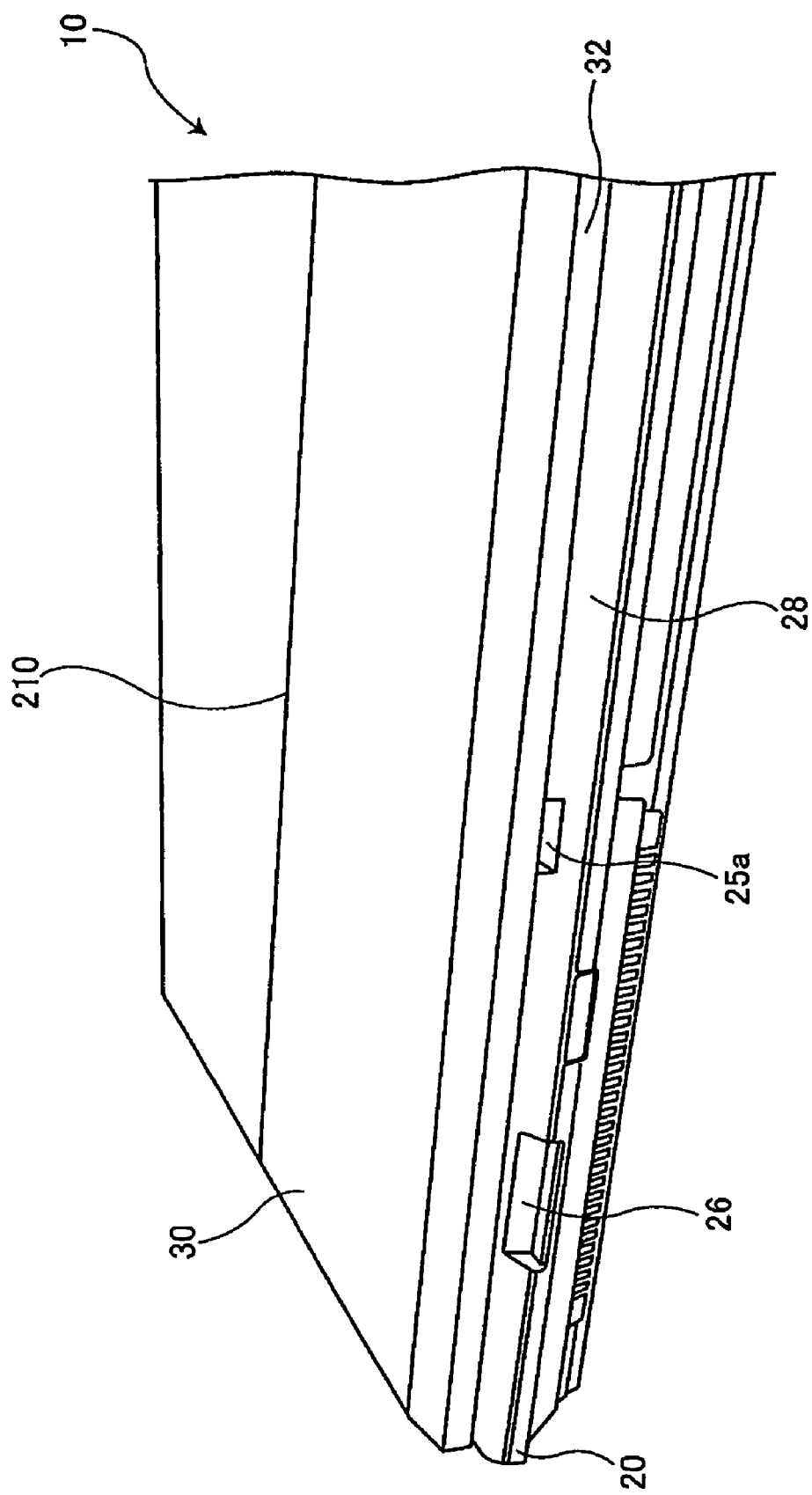
FIG. 19 is a diagram showing the vicinity of a front end of the personal computer in a state of the display unit being closed.

FIG. 19 is a diagram showing the vicinity of a front end of the personal computer 10 in a state of the display unit 30 being closed.

As shown in FIG. 19, the main unit 20 projects frontward further than the display unit 30, and the medium loading aperture 26 and the guide 25a are exposed on the surface of the personal computer 10. A user can easily open the display unit 30 by inserting a finger to the medium loading aperture 26 or the guide 25a. The medium loading aperture 26 is advantageously provided on the front of the main housing 28 so as to load a small recording medium while the display unit 30 is closed. The fingerprint sensor 25 is advantageously provided on the front of the main housing 28 so as to form the sufficiently long guide 25a for improvement of the accuracy of fingerprint authentication. Moreover, the medium loading aperture 26 of the personal computer 10 is open on the front end and top side of the personal computer 10, so that a user can determine whether or not a small recording medium is loaded by viewing from the top side while operating the personal computer 10, for example. In this manner, it is preferable that the medium loading aperture 26 and the fingerprint sensor 25 are originally provided at the front of the main housing 28. For the personal computer 10 according to this embodiment, it is not necessary to newly prepare a part such as a push button or form a cavity on the main housing 28, limiting enlargement of the apparatus and increase of the production cost and improving the operability.

An effort is made also on the hinge section 40 of the personal computer 10 to facilitate open/close operation of the display unit 30.

Figure 20:
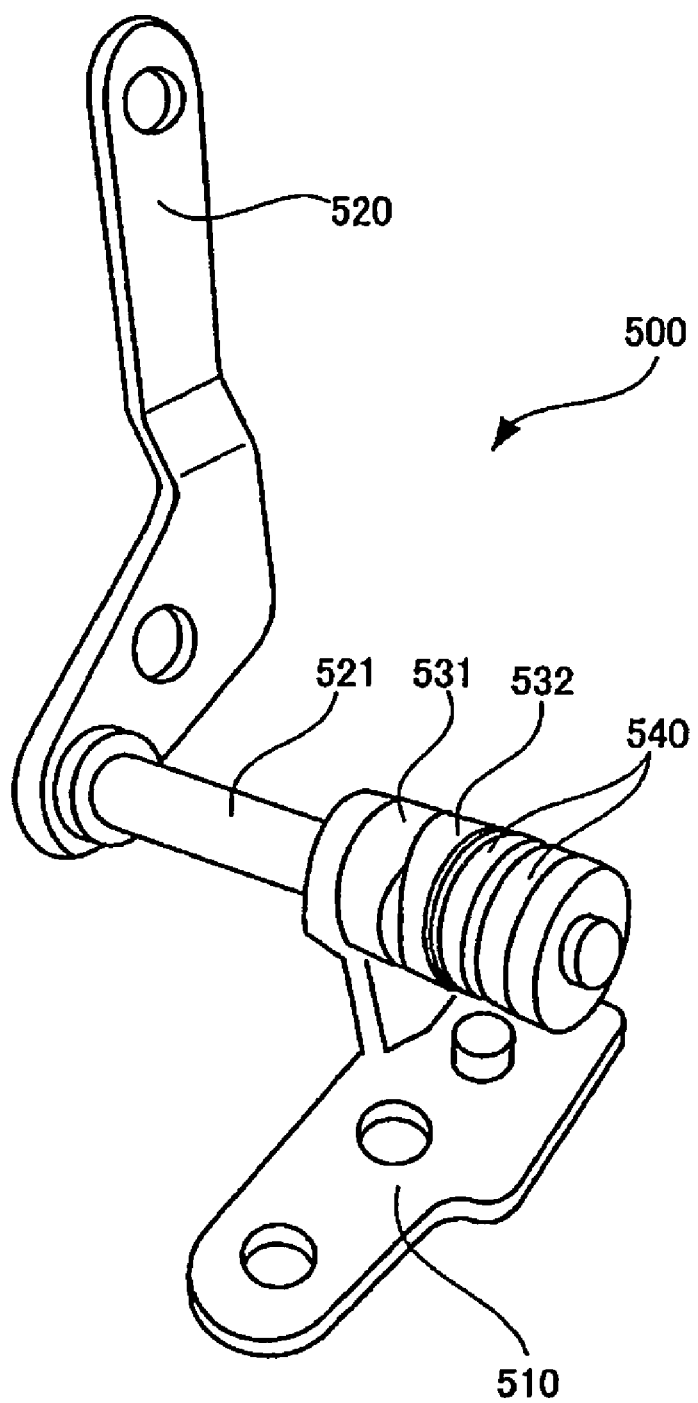
FIG. 20 is an enlarged view of a hinge part used for a hinge section.

FIG. 20 is an enlarged view of a hinge part 500 used for the hinge section 40.

A hinge part 500 includes: a body fixing section 510 attached to the main unit 20; a display fixing section 520 attached to the display unit 30; a rotation axis 521 that causes the display fixing section 520 to pivot on the body fixing section 510; a fixed cam section 531 fixed to the body fixing section 510; a rotating cam section 532 rotating with the rotation axis 521; and a belleville spring 540 that pushes the rotating cam section 532 against the fixed cam section 531. The fixed cam section 531 and the rotating cam section 532 have tapered surfaces that engage each other.

FIG. 20 shows a state of the display unit 30 being opened by 90 degrees relative to the main unit 20. In the state of the display unit 30 being opened by about 90 degrees, the tapered surface of the rotating cam section 532 completely runs upon the tapered surface of the fixed cam section 531, and the rotation is locked in the direction to close the display unit 30 of the rotating cam section 532.

Figure 21:
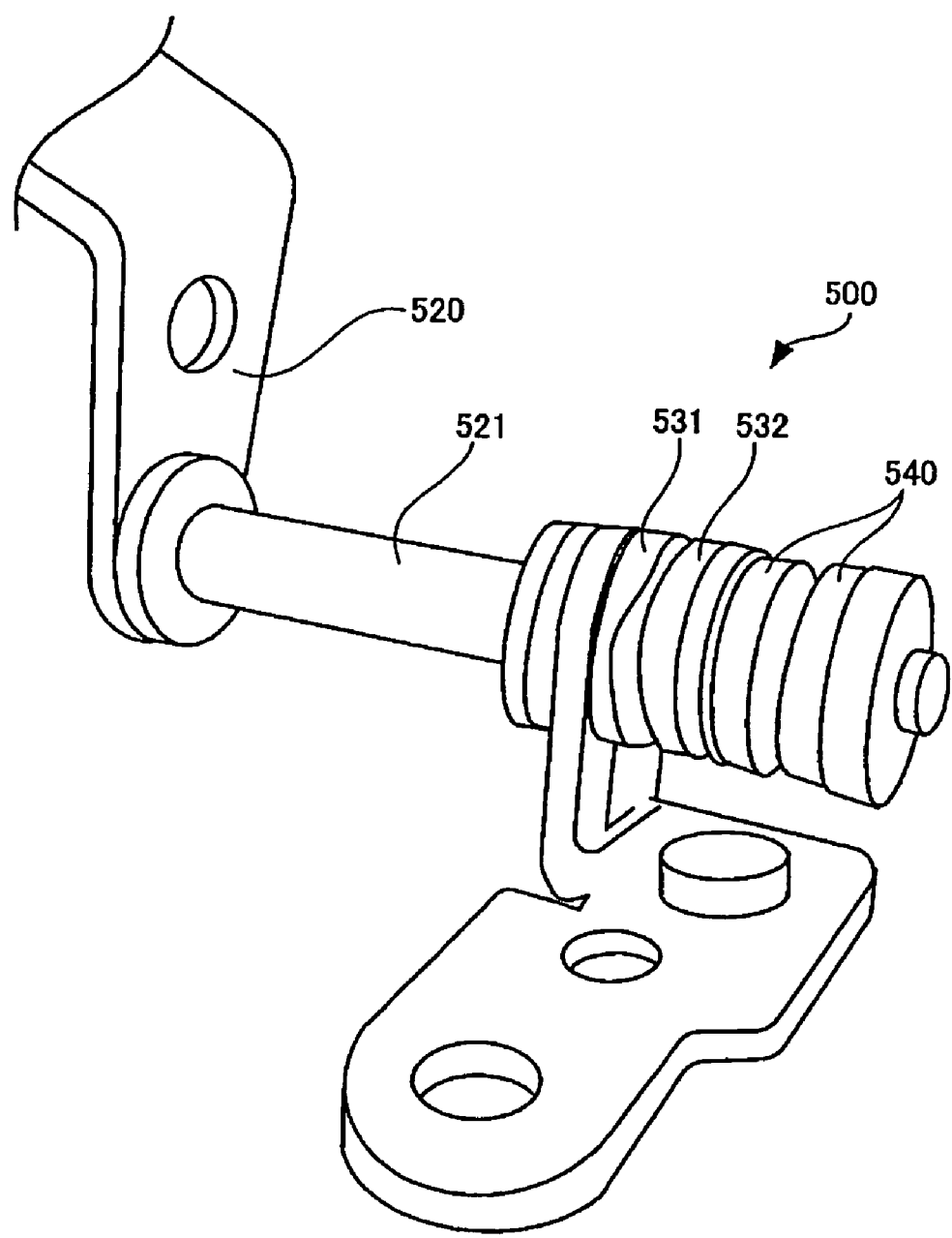
FIG. 21 is a diagram showing a state of the hinge section in a stage in that the display unit is being closed.
Figure 22:
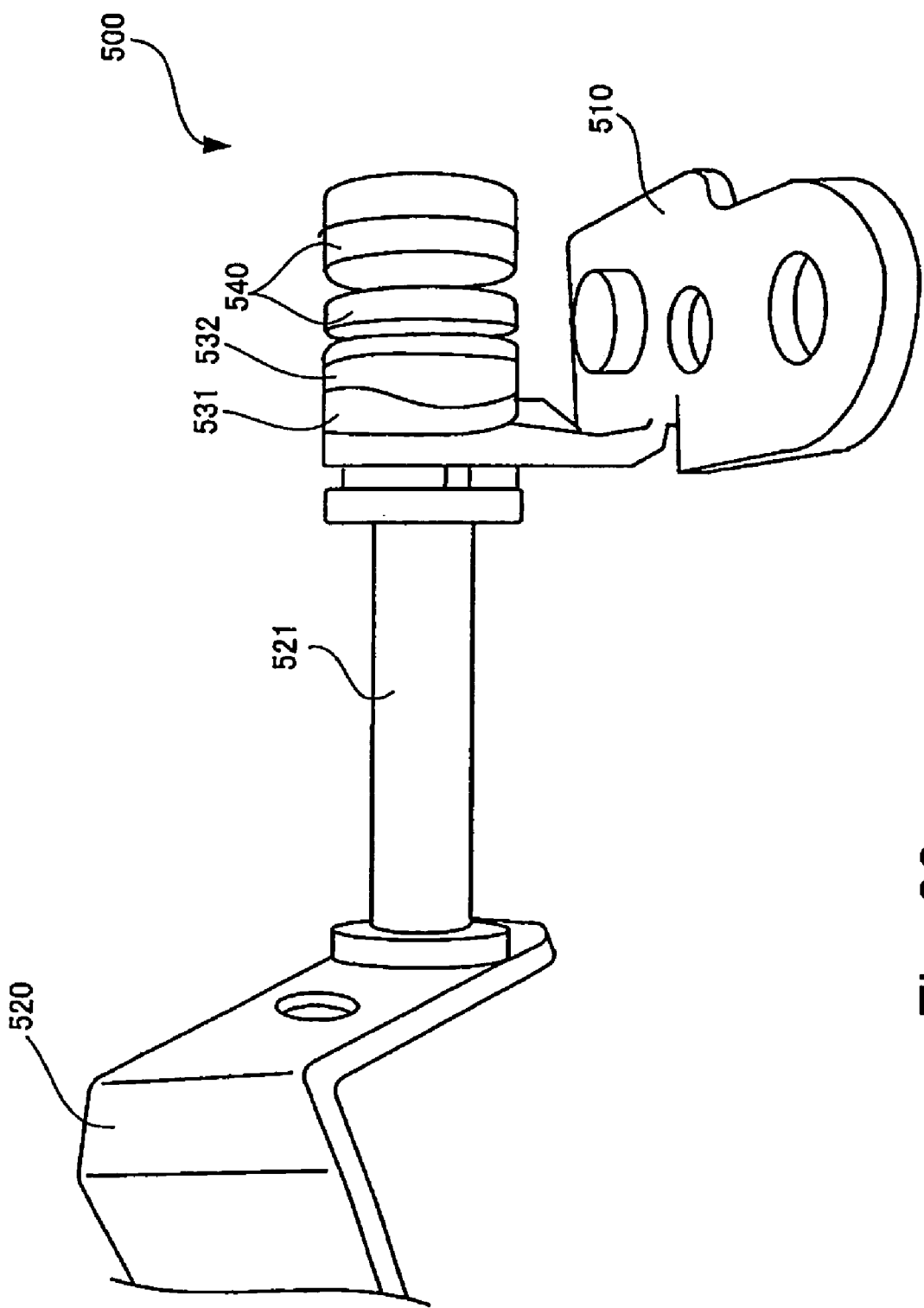
FIG. 22 is a diagram showing a state of the hinge section in that the display unit is in the closed position relative to the main unit.

FIG. 21 is a diagram showing the hinge section 40 in a stage in that the display unit 30 is being closed. FIG. 22 is a diagram showing the hinge section 40 in that the display unit 30 is in the closed position relative to the main unit 20.

When the display unit 30 begins to be closed, the display fixing section 520 pivots so that the rotating cam section 532 rotates and the lock is released. When the display unit 30 is closed within a predetermined angle, the rotating cam section 532 slides in such a direction along the tapered surface of the fixed cam section 531 that they engage each other, and the display unit 30 is urged in a direction to be closed relative to the main unit 20. When the display unit 30 is in the closed position relative to the main unit 20, the tapered surfaces of the rotating cam section 532 and the fixed cam section 531 engage each other, as shown in FIG. 22.

In this manner, on the personal computer 10, when the display unit 30 is closed to a predetermined extent, then the display unit 30 is urged in a direction in which it is closed, so that it can be easily opened/closed by one hand.

This concludes the description of the first embodiment of the electronic device, and a second embodiment of the electronic device will be described. In the second embodiment of the electronic device, only the form of the rear cover that covers the back surface of the LCD panel differs from that in the first embodiment, and the other elements are almost the same as those of the first embodiment. Accordingly, the same elements as those of the first embodiment are assigned the same reference numerals as those of the first embodiment and will not be further described, but only the features different from the first embodiment will be described.

Figure 23:
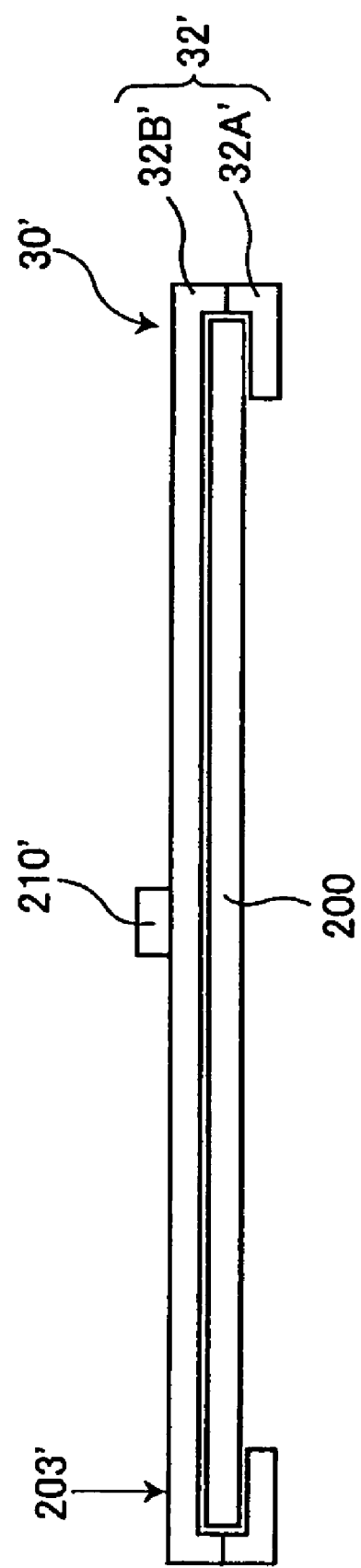
FIG. 23 is a cross-sectional view of a display unit being cut across the surface being vertical to the longitudinal direction of the personal computer.

FIG. 23 is a cross-sectional view of a display unit 30' being cut across the surface being vertical to the longitudinal direction of the personal computer 10.

For the display unit 30' in this embodiment, a convex portion 210' is provided on a back section 203' which is a part of a rear cover 32B'. On the display unit 30' in this embodiment, the convex portion 210', which is not formed by folding, is formed on the plate material, and the gap S1 as shown in FIG. 6 is not provided between the LCD panel 200 and the back section 203'.

In this manner, the convex portion provided on the display housing can be formed by a method other than folding. However, by folding, the gap S1 is formed between the LCD panel 200 and the back section 203 so that a shock due to falling is advantageously absorbed or the production is advantageously easy.

This concludes the description of the second specific embodiment of the electronic device, and a third embodiment of the electronic device will be described. Also in the third embodiment of the electronic device, only the form of the back surface cover that covers the back surface of the LCD panel differs from that in the first embodiment. Accordingly, only the features different from the first embodiment will be described.

Figure 24:
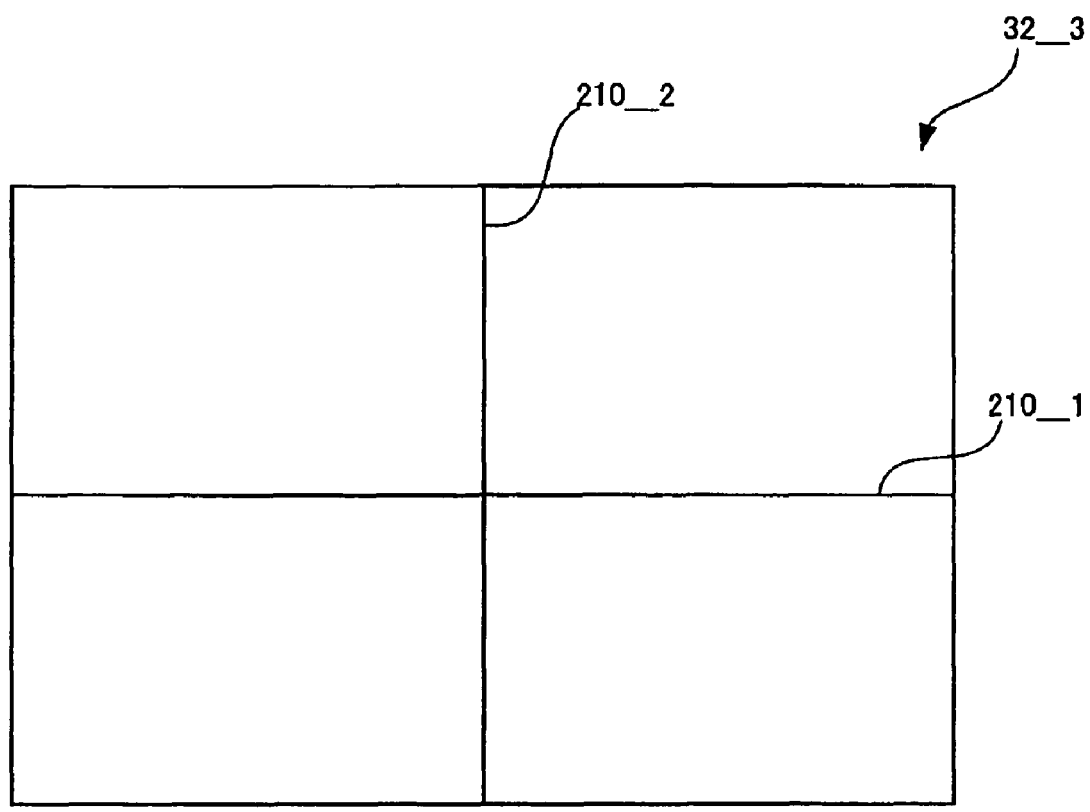
FIG. 24 is a diagram showing the back side of a display housing.

FIG. 24 is a diagram showing the back side of a display housing 32_3.

In this embodiment, on the back side of the display housing 32_3, there are provided a first convex portion 210_1 that extends in the longitudinal direction of the LCD panel 200 and the second convex portion 210_2 that extends in the vertical direction to the first convex portion 210_1.

As described above, in addition to the first convex portion 210_1 that extends in the longitudinal direction of the LCD panel 200, the second convex portion 210_2 that extends in the vertical direction to the first convex portion 210_1 is provided, so that the strength of the display housing 32_3 can be further improved.

The above description refers to a personal computer as one example of the "electronic device" described in "SUMMARY OF THE INVENTION". However, the electronic device can be a notebook computer, PDA, game machine, TV, mobile phone or the like.

The above description also refers to an LCD panel as an example of the display panel. However, the present invention is not limited to the LCD panel, and may be any other type of display panel such as a plasma display, field emission display, or organic EL display.

What is claimed is:

1. An electronic device comprising:
    a first housing that includes an inlet and an outlet on one end;
    a second housing; and
    a linkage section that links the second housing to the first housing such that the second housing can be opened and closed, wherein
    the linkage section holds the second housing so that the second housing is rotatable around a rotation axis which passes through the one end of the first housing,
    when the second housing is closed, the second housing covers a top surface of the first housing except for a region on the top surface which is positioned above the rotation axis and extends along the rotation axis, and when the second housing is opened, the second housing is rotated to be away from the top surface,
    the outlet is exposed both when the second housing is closed and when the second housing is opened, by being arranged on a back surface of the first housing which contacts with the top surface by a common side of the back surface and the top surface and which extends along the rotation axis, and
    the inlet is exposed both when the second housing is closed and when the second housing is opened, by being arranged a distance away from the outlet, on a boundary region between the back surface and the region on the top surface.

2. The electronic device according to claim 1, wherein the inlet is positioned above the outlet on the one end.

3. The electronic device according to claim 1, wherein the one end of the first housing provided with the inlet and the outlet is an end side provided with the linkage section on the first housing.

4. The electronic device according to claim 1, wherein the first housing contains a main processing circuit and a cooling fan that cools the main processing circuit using the inlet and the outlet; and the second housing is a display section of the electronic device that displays a result of processing by the main processing circuit.

5. The electronic device according to claim 1, further comprising a keyboard on a top surface of the first housing.

6. The electronic device according to claim 1, wherein the first housing is a main section of the electronic device containing a main processing circuit; and the inlet is positioned in the first housing such that the inlet is above the main processing circuit and exposed while the second housing is closed.

7. The electronic device according to claim 1, wherein the outlet is arranged on only the back surface of all surfaces of the first housing including the back surface, the top surface, and two side surfaces each of which contacts with the top surface by a common side of the top surface and the each of the two side surfaces and contacts with the back surface by a common side of the back surface and the each of the two side surfaces.

* * * * *